US011002243B2

(12) United States Patent
Lehmann et al.

(10) Patent No.: US 11,002,243 B2
(45) Date of Patent: May 11, 2021

(54) SUBMERGED WAVE ENERGY CONVERTER FOR DEEP WATER OPERATIONS

(71) Applicant: The Regents of the University of California, Oakland, CA (US)

(72) Inventors: Marcus Lehmann, Berkeley, CA (US); Mohammad-Reza Alam, Berkeley, CA (US); Thomas Boerner, Berkeley, CA (US); Nigel Kojimoto, Albany, CA (US); Bryan Murray, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/960,336

(22) Filed: Apr. 23, 2018

(65) Prior Publication Data
US 2018/0306164 A1    Oct. 25, 2018

Related U.S. Application Data

(60) Provisional application No. 62/489,386, filed on Apr. 24, 2017.

(51) Int. Cl.
*F03B 13/00* (2006.01)
*F03B 13/10* (2006.01)
(Continued)

(52) U.S. Cl.
CPC ............ *F03B 13/10* (2013.01); *F03B 13/148* (2013.01); *F03B 13/186* (2013.01);
(Continued)

(58) Field of Classification Search
CPC ...................... F05B 2260/406; F05B 2270/18; F03B 13/10; F03B 13/148; F03B 13/186; F03B 13/187
(Continued)

(56) References Cited

U.S. PATENT DOCUMENTS 2,109,173 A * 2/1938 Herndon ............... F03B 13/187
417/333
4,408,454 A * 10/1983 Hagen ................. F03B 13/1815
60/500
(Continued)

FOREIGN PATENT DOCUMENTS

EP     2162617 B1     8/2012
GB     191109231 A *  5/1911   .............. F03B 13/20
(Continued)

OTHER PUBLICATIONS

International Search Report and Written Opinion, dated Oct. 8, 2018 (20 pages).
(Continued)

*Primary Examiner* — Julio C. Gonzalez
(74) *Attorney, Agent, or Firm* — Sterne, Kessler, Goldstein & Fox P.L.L.C.

(57) ABSTRACT

A submergible wave energy converter and method for using the same are described. Such a wave energy converter may be used for deep water operations. In one embodiment, the wave energy converter apparatus comprises an absorber having a body with an upper surface and a bottom surface and at least one power take-off (PTO) unit coupled to the absorber and configured to displace movement of the absorber body relative to a reference, where the power take-off unit is operable to perform motion energy conversion based on displacement of the absorber body relative to the reference in response to wave excitation, and where the power take-off unit is operable to return the absorber body from a displaced position to a predefined equilibrium position and to provide a force acting on the absorber body for energy extraction.

18 Claims, 22 Drawing Sheets

(51) Int. Cl.
  *F03B 13/18* (2006.01)
  *F03B 13/14* (2006.01)
(52) U.S. Cl.
  CPC ........ *F03B 13/187* (2013.01); *F05B 2250/22* (2013.01); *F05B 2250/72* (2013.01); *F05B 2260/406* (2013.01); *F05B 2270/18* (2013.01); *Y02E 10/20* (2013.01); *Y02E 10/30* (2013.01)
(58) Field of Classification Search
  USPC .................................................. 290/42, 53
  See application file for complete search history.

(56) References Cited

U.S. PATENT DOCUMENTS

| | | | |
|---|---|---|---|
| 4,490,621 A * | 12/1984 | Watabe | F03B 13/182 290/42 |
| 4,698,969 A | 10/1987 | Raichlen et al. | |
| 4,754,157 A | 6/1988 | Windle | |
| 4,868,408 A * | 9/1989 | Hesh | F03B 3/04 290/52 |
| 5,548,177 A | 8/1996 | Carroll | |
| 6,229,225 B1 | 5/2001 | Carroll | |
| 6,392,314 B1 | 5/2002 | Dick | |
| 6,617,705 B1 * | 9/2003 | Smalser | F03B 13/1855 290/42 |
| 6,731,019 B2 | 5/2004 | Burns et al. | |
| 6,756,695 B2 | 6/2004 | Hibbs et al. | |
| 6,768,216 B1 | 7/2004 | Carroll et al. | |
| 6,768,217 B2 | 7/2004 | Chalmers et al. | |
| 6,772,592 B2 | 8/2004 | Gerber et al. | |
| 6,812,588 B1 | 11/2004 | Zadig | |
| 6,933,623 B2 | 8/2005 | Carroll et al. | |
| 6,935,808 B1 | 8/2005 | Dempster | |
| 7,140,180 B2 | 11/2006 | Gelber et al. | |
| 7,141,888 B2 | 11/2006 | Sabol et al. | |
| 7,168,532 B2 | 1/2007 | Stewart et al. | |
| 7,298,054 B2 | 11/2007 | Hirsch | |
| 7,305,823 B2 * | 12/2007 | Stewart | F03B 13/1845 290/42 |
| 7,310,944 B2 | 12/2007 | Sabol et al. | |
| 7,323,790 B2 | 1/2008 | Taylor et al. | |
| 7,348,764 B2 | 3/2008 | Stewart et al. | |
| 7,443,046 B2 | 10/2008 | Stewart et al. | |
| 7,476,137 B2 | 1/2009 | Stewart et al. | |
| 7,498,685 B2 | 3/2009 | Turner | |
| 7,594,780 B2 | 9/2009 | Bull | |
| 7,658,067 B2 | 2/2010 | Gerber | |
| 7,816,797 B2 | 10/2010 | Nair | |
| 7,877,994 B2 | 2/2011 | Bull et al. | |
| 7,878,734 B2 * | 2/2011 | Bull | B63B 35/4406 405/76 |
| 7,886,680 B2 | 2/2011 | Draper | |
| 7,964,977 B2 | 6/2011 | Nair | |
| 7,980,832 B2 | 7/2011 | Ahdoot | |
| 8,093,736 B2 * | 1/2012 | Raftery | F03B 13/1885 290/42 |
| 8,629,572 B1 | 1/2014 | Phillips | |
| 8,946,919 B2 | 2/2015 | Phillips | |
| 8,946,920 B2 | 2/2015 | Phillips | |
| 8,952,560 B2 | 2/2015 | Phillips | |
| 8,963,358 B2 | 2/2015 | Phillips | |
| 9,476,400 B2 | 10/2016 | Phillips | |
| 9,541,054 B2 | 1/2017 | You et al. | |
| 9,624,900 B2 | 4/2017 | Phillips et al. | |
| 9,644,601 B2 | 5/2017 | Phillips | |
| 9,777,701 B2 | 10/2017 | Alam et al. | |
| 10,011,910 B2 | 7/2018 | Phillips | |
| 10,047,717 B1 | 8/2018 | Phillips | |
| 10,190,568 B2 | 1/2019 | Gregory | |
| 10,240,575 B2 | 3/2019 | Dragic | |
| 2002/0047273 A1 | 4/2002 | Burns et al. | |
| 2003/0193197 A1 | 10/2003 | Hibbs et al. | |
| 2005/0084333 A1 | 4/2005 | Zadig | |
| 2006/0208839 A1 | 9/2006 | Taylor et al. | |
| 2007/0126239 A1 * | 6/2007 | Stewart | F03B 13/20 290/53 |
| 2007/0164568 A1 | 7/2007 | Greenspan et al. | |
| 2007/0228737 A1 | 10/2007 | Hirsch | |
| 2007/0261404 A1 * | 11/2007 | Stewart | F03B 15/00 60/495 |
| 2008/0260548 A1 | 10/2008 | Ahdoot | |
| 2008/0309088 A1 | 12/2008 | Agamloh et al. | |
| 2009/0085357 A1 * | 4/2009 | Stewart | F03B 13/16 290/53 |
| 2009/0121486 A1 | 5/2009 | Ganley | |
| 2010/0133843 A1 | 6/2010 | Nair | |
| 2010/0148504 A1 * | 6/2010 | Gerber | F03B 13/16 290/42 |
| 2011/0012358 A1 | 1/2011 | Brewster et al. | |
| 2011/0062713 A1 | 3/2011 | Ardoise et al. | |
| 2011/0074160 A1 | 3/2011 | Chua | |
| 2011/0084488 A1 * | 4/2011 | Eder | F03B 13/186 290/53 |
| 2011/0089697 A1 | 4/2011 | Nair | |
| 2011/0133463 A1 | 6/2011 | Nair et al. | |
| 2012/0247098 A1 * | 10/2012 | Stewart | F03B 11/00 60/501 |
| 2013/0034454 A1 | 2/2013 | Smith | |
| 2013/0127168 A1 | 5/2013 | Dragic | |
| 2014/0117673 A1 | 5/2014 | Phillips | |
| 2014/0117674 A1 | 5/2014 | Phillips | |
| 2014/0138958 A1 * | 5/2014 | Verdegem | F03B 13/14 290/1 R |
| 2014/0313001 A1 | 10/2014 | Phillips | |
| 2014/0339928 A1 | 11/2014 | Phillips | |
| 2015/0063910 A1 | 3/2015 | Meltsov et al. | |
| 2015/0145258 A1 | 5/2015 | Phillips | |
| 2016/0010619 A1 | 1/2016 | Phillips | |
| 2016/0108883 A1 * | 4/2016 | Alam | F03B 13/187 60/505 |
| 2016/0186715 A1 | 6/2016 | Fait | |
| 2016/0252071 A1 | 9/2016 | Phillips et al. | |
| 2017/0198401 A1 | 7/2017 | Phillips | |
| 2018/0306164 A1 | 10/2018 | Lehmann et al. | |
| 2019/0145373 A1 | 5/2019 | Lehmann et al. | |
| 2019/0285044 A1 | 9/2019 | Dragic | |
| 2019/0315595 A1 | 10/2019 | Hattori et al. | |

FOREIGN PATENT DOCUMENTS

| | | |
|---|---|---|
| GB | 2015657 A | 9/1979 |
| GB | 2461792 A | 1/2010 |
| RU | 2568012 C1 * | 11/2015 |
| WO | WO 99/66198 A1 | 12/1999 |
| WO | 2008/065684 A1 | 6/2008 |
| WO | WO 2013/068748 A2 | 5/2013 |
| WO | WO 2017/189455 A1 | 11/2017 |

OTHER PUBLICATIONS

International Search Report and Written Opinion, dated Jul. 27, 2017 (8 pages).
Extended European Search Report in EP Application No. 18791340.5, dated Sep. 11, 2020 (7 pages).

\* cited by examiner

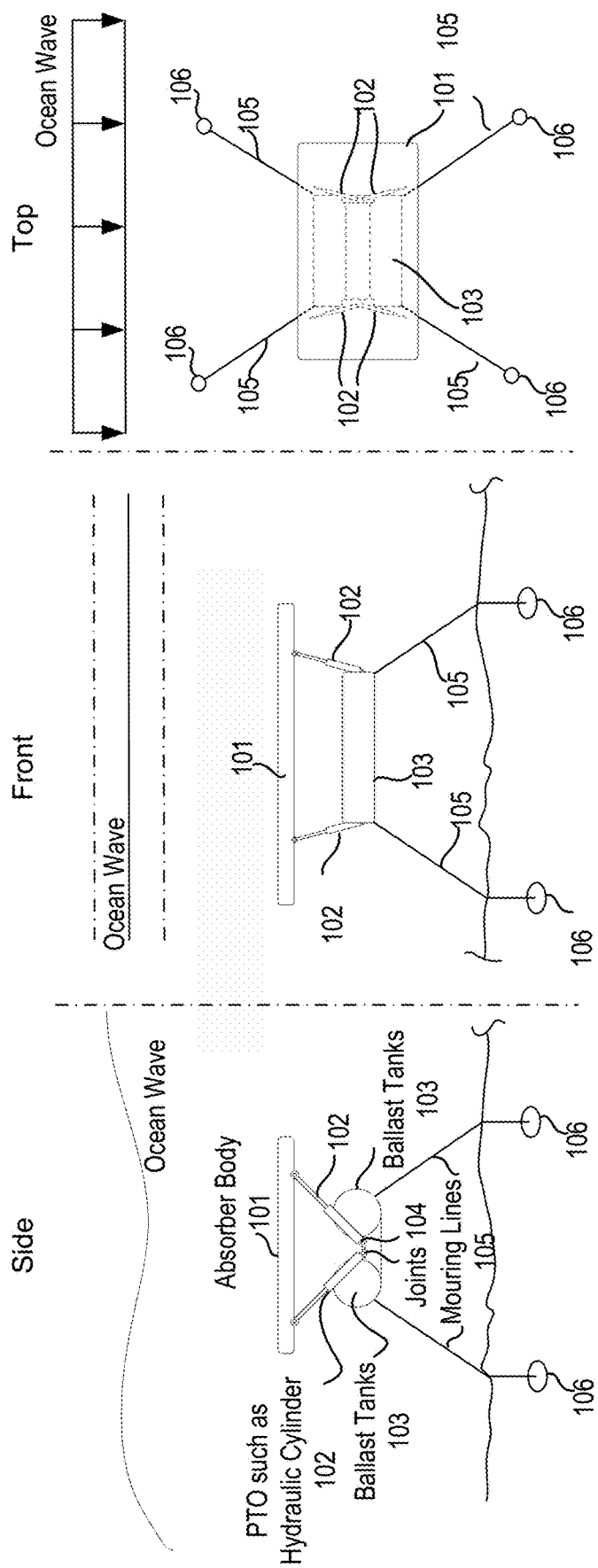

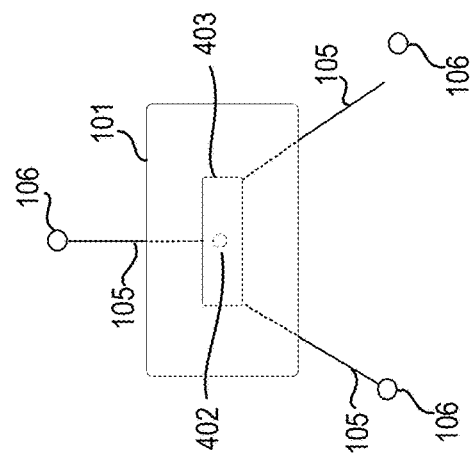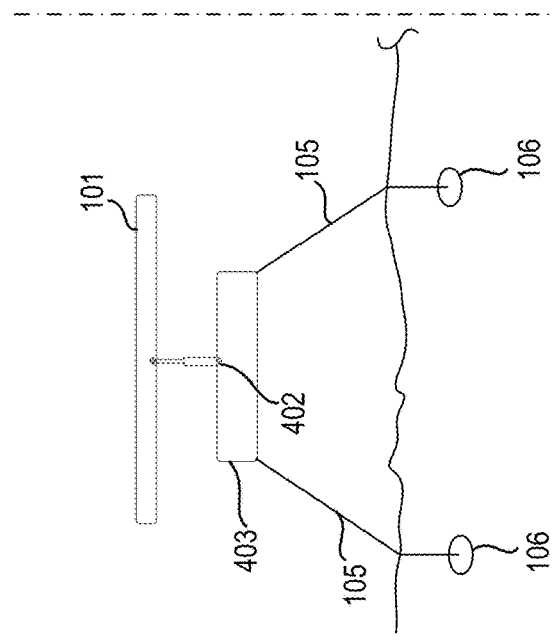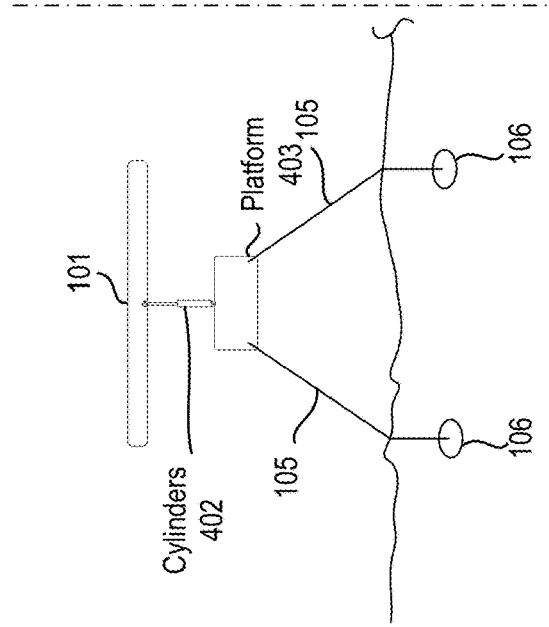

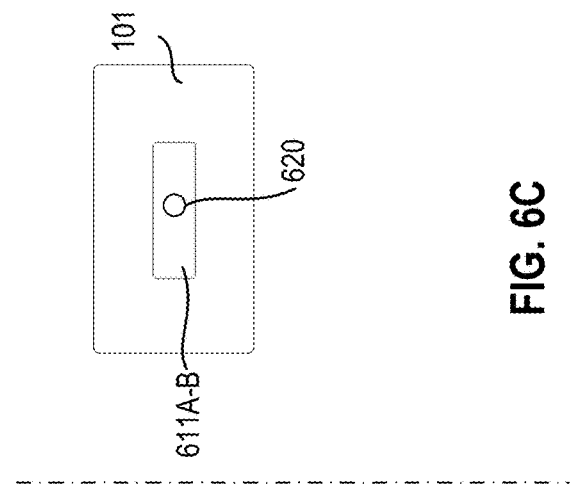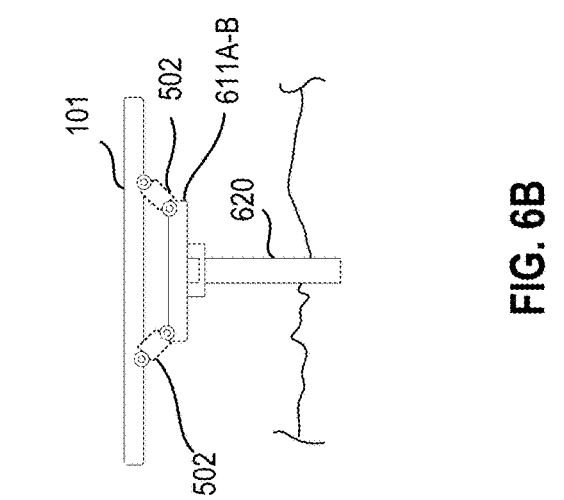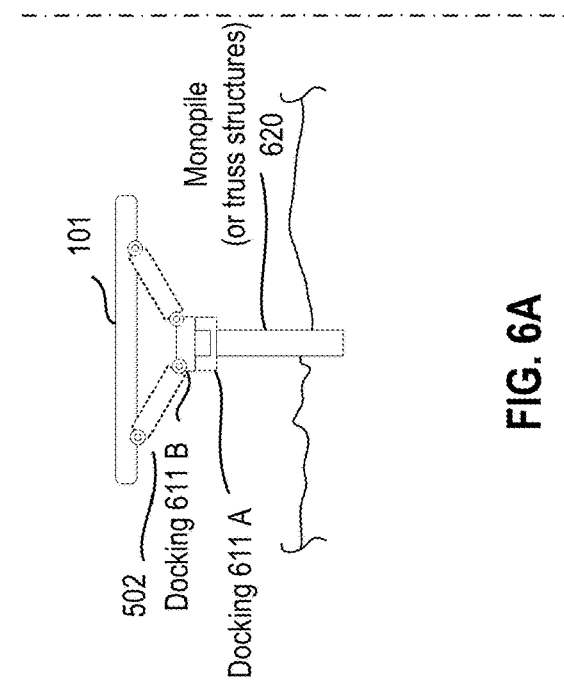

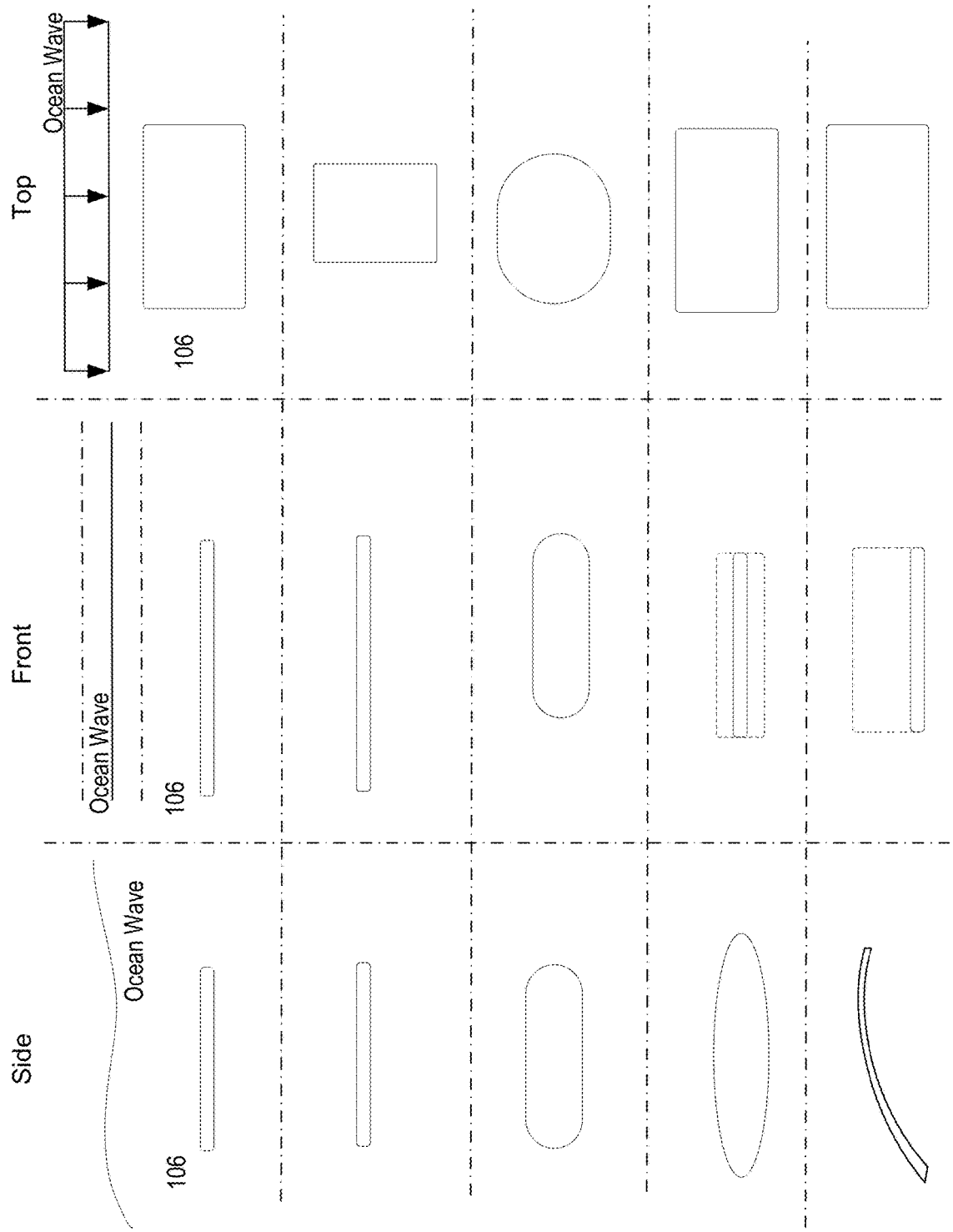

Single-line diagram of an HVAC wave farm

US 11,002,243 B2

SUBMERGED WAVE ENERGY CONVERTER FOR DEEP WATER OPERATIONS

PRIORITY

The present patent claims priority to and incorporates by reference the corresponding provisional patent application Ser. No. 62/489,386, titled, "Submerged Wave Energy Converter for Deep Water Operations," filed on Apr. 24, 2017.

STATEMENT REGARDING FEDERALLY SPONSORED RESEARCH OR DEVELOPMENT

This invention was made with Government support under DE-AC02-05CH11231, awarded by the Department of Energy. The Government has certain rights in the invention.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

FIELD OF THE INVENTION

The technology of this disclosure pertains generally to renewable electricity generation, and more particularly to a system and platform for wave energy extraction using an absorber actuating one or more power take-off units.

BACKGROUND

The oceans of the world have long been recognized as a potential continuous and abundant source of natural mechanical energy. Increasing global demand for electricity and the need for alternatives to fossil fuel production make harnessing wave energy to produce electricity an attractive endeavor. Energy from the ocean could help to relieve the electricity generation load in many heavily populated regions of the world as well as to reduce the volume of environmentally harmful emissions.

However, successful harvesting of energy from waves for conversion into electrical energy has been generally limited to small scale applications, and few existing systems are capable of providing electricity to established power grids. There are a number of reasons for the lack of utilization of wave energy in spite of over 200 years of innovations. One significant reason for the slow utilization of the available energy from the oceans is the damage and destruction that can occur to generating devices from exposure to wave energy from storms, rogue waves and exposure to a high salt marine environment. Many conventional wave energy converters extract power from the surface of the ocean and must be engineered to survive the power of the harshest ocean storms, which increases the design complexity as well as capital costs.

In addition to being unable to withstand rough weather, the performance of many generating devices will drop significantly during rough weather. Surface wave energy converters rely on regular and consistent wave formation using vertical motion (heave) to convert the wave energy and rely on the shape of the incident wave. Irregular wave behavior during storms or areas without a consistent flow of powerful waves results in power generation that is unpredictable and erratic and therefore unsuitable as a source for existing power grids. Other surface wave energy converters produce highly distorted power due to the reciprocal motion induced by the ocean waves.

Wave energy converters may also be location limited. Surface devices may interfere with the activity of commercial and private vessels and therefore cannot be placed in shipping lanes. Generating systems must also be in close proximity to the shore because it is difficult to transfer generated energy a great distance from the shore. Therefore, wave energy is not a viable power source in all settings because of the location of generation.

Capital costs, maintenance costs and repair costs have been another barrier to widespread installation of fields of wave energy converters. The useful lifetime, reliability and maintenance requirements of wave energy devices are important economic factors considered in such electrical generation investments. Devices that frequently break down produce unacceptable electricity production losses, income losses and increased operational costs. Furthermore, as the demand for renewable energy technologies increases, the cost of investment and construction of wave energy extraction generating systems and devices is expected to decrease.

Successful harvesting of energy from waves for conversion into electrical energy has also been problematic because the power quality that is produced by these devices is poor due to the irregular velocity of the power generating structures as a result of the irregular spectral nature of the incoming ocean wave. Consequently, the generator is not able to operate at a constant speed for optimum efficiency. Rather, the output power is continuously, fluctuating from zero to a peak and back in every wave where the device absorber linkage is directly connected to its generator.

Although devices for extracting wave energy to perform work in some form have been developed since the 1700's, only a few full scale wave energy projects have been constructed. Wave energy technologies that have been developed tend to be variations of three general schemes: wave capture devices, oscillating water column devices and wave profile devices.

Accordingly, there is a need for a reliable way to harness wave power to produce electrical energy in remote marine environments that is efficient, easy to maintain and low in cost.

SUMMARY OF THE DISCLOSURE

A submergible wave energy converter and method for using the same are described. Such a wave energy converter may be used for deep water operations. In one embodiment, the wave energy converter apparatus comprises an absorber having a body with an upper surface and a bottom surface and at least one power take-off (PTO) unit coupled to the absorber and configured to displace movement of the absorber body relative to a reference, where the power take-off unit is operable to perform motion energy conversion based on displacement of the absorber body relative to the reference in response to wave excitation, and where the power take-off unit is operable to return the absorber body from a displaced position to a predefined equilibrium position and to provide a force acting on the absorber body for energy extraction.

Further aspects of the technology described herein will be brought out in the following portions of the specification, wherein the detailed description is for the purpose of fully disclosing embodiments of the technology without placing limitations thereon.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 1A-C illustrate side, front and top views, respectively, of one embodiment of a wave energy converter apparatus for converting wave energy to usable power.

FIGS. 4A-C illustrate side, front and top views, respectively, of another alternative embodiment of a wave energy converter apparatus.

FIGS. 6A-C illustrate side, front and top views, respectively, of another alternative embodiment of a wave energy converter apparatus.

FIGS. 11A-C illustrate side, front and top views, respectively, of a further embodiment of a wave energy converter apparatus absorber aspect ratios, geometries and shapes.

FIGS. 22A-B illustrate examples of interfaces used to interface hydraulic cylinders to a hydraulic motor and generator, including the coupling in between.

DETAILED DESCRIPTION

Figure 2C:
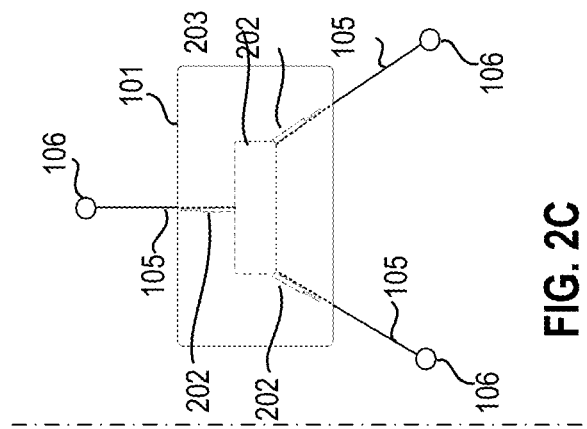
FIGS. 2A-C illustrate side, front and top views, respectively, of an alternative embodiment of a wave energy converter apparatus.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A system and method for converting wave energy of ocean waves to a motive force derived from pressure differentials created by the system's interaction with ocean water are described. In one embodiment, the system comprises at least one submersible wave energy harvesting body, at least one power take-off unit, at least one restoring force mechanism, and a reaction mechanism providing force acting on the absorber body for energy extraction. In one embodiment, the body includes a system for managing structural loads to maintain energy extraction at a high, and potentially maximum, level while mitigating damaging loads.

FIGS. 1A-C illustrate side, front and top views, respectively, of one embodiment of a wave energy converter apparatus for converting wave energy to usable power. The apparatus converts wave energy to mechanically usable power such as, for example, a torque on a rotary shaft that can drive an electric generator, hydraulic pump or other consumers. The wave energy is captured by utilizing a submerged body, referred to as an absorber herein, that is excited by incident waves, creating a pressure differential between the top and bottom sides of the absorber. This pressure differential leads to alternating area loads across the area of the absorber and ultimately to oscillating relative motion of the absorber predominantly in heave, surge, and pitch degrees of freedom (DOF) but also the sway and roll DOF for off-neutral-axis incident waves.

Referring to FIGS. 1A-C, in one embodiment, the wave energy converter apparatus has two main structural elements: 1) an upper, slender, horizontally oriented absorber 101, with the main function of a fluid-structure interaction for high performance wave to mechanical energy conversion; and, 2) a lower base 103, that is responsible for providing a reaction point for the damping and restoring force elements allowing for energy extraction of the absorber 101 from waves.

In one embodiment, the body of absorber 101 is rigid, semi-rigid or flexible and the structure is able to extract energy from water waves by surge, heave, pitch, roll, yaw, and/or sway excitation. In one embodiment, absorber 101 is rectangular in shape with dimensions of 20 m by 40 m. Note that other shapes and sizes of absorbers may be used, such as those shown, for example, in FIGS. 11A-11C. In one embodiment, absorber 101 comprises a composite of steel beams, steel or fiberglass plates and has a frame profile that is reinforced by main and minor beams and load distributing cross beams and partially filled with polyurethane foam or sealed pressure vessels and a ballast system to create a body with neutral or controlled positive buoyancy.

The top surface of the body of absorber 101 is preferably planar. However, the top surface may also be altered in a way that induces desired drag and turbulence leading to an improved fluid structure interaction (FSI), and thus improved energy transfer from wave to structure. This could be in a form of surface roughness or vertical structures blocking or redirecting water flow over the surface. For example, in one embodiment, winglet extensions may be attached to prevent neutralization of the dynamic pressure difference on the side edges of absorber 101.

In one embodiment, absorber 101 comprise a plate that is constrained to split the water particles' orbital motions induced by ocean waves, thus creating independent locally-varying and time-varying pressures above and below the body of absorber 101, thereby inducing a motive force from the local and total pressure differential. The motion is then transferred to one or more power take-off units (PTOs), which include, in one embodiment, hydraulic cylinders 102, which transform the motion of absorber 101 into a standard form of mechanical power. A restoring force is provided to ensure absorber 101 oscillates about a set equilibrium. A reaction mechanism is used to oppose the displacement of the power takeoff and thus transfer energy to a new mechanical form but is also capable of aiding the displacement of the PTO for increased net power extraction.

Absorber 101 is excited by the dynamic pressure difference created by overpassing waves, which produces a dynamic area load on the absorber. The horizontally oriented absorber 101 horizontally splits the pressure gradient underneath incident waves, creating a pressure differential across it. This pressure differential leads to alternating area loads across the absorber area and ultimately to oscillating relative motion of absorber 101 predominantly in heave, surge, and pitch degrees of freedom (DOF) but also the sway and roll DOF for off-neutral-axis incident waves. The main function of absorber 101 is to increase, and potentially maximize, the oscillating motion in heave, surge and pitch induced by the wave excitation load/water particle motion around the structure for on-neutral-axis waves and also in sway and roll for off-neutral-axis waves.

In one embodiment, lower base platform 103 comprises a set of ballast tanks that provide neutral or controllable positive buoyancy. Restoring forces that react to oppose the compression of cylinders 102 of the PTOs are enabled by the positive buoyant ballast system integrated into platform 103.

In one embodiment, the body of absorber 101 and lower base platform structure 103 are mechanically connected through joints with four hydraulic cylinders 102 that serve as power take-off (PTO) units in the embodiment shown in FIG. 1A-1C. Although four hydraulic cylinders 103 are preferred, it will be seen that fewer than four or more than four cylinders as well as alternative force mechanisms can be used as power take off units. Cylinders 103 can be single or double acting damping elements acting as a power take-off system extracting energy from absorber 101. Cylinders 102 can also be individually actuated and/or excited independently and each can be adjusted in their damping characteristics.

In one embodiment, hydraulic cylinders 102 are connected on one end to the body of absorber 101 by a joint 104 and to the lower base platform 103 on the other with the joint, where the joints can be universal, gimbal or other type of mechanical joint providing the same degrees of freedom with the desired reduction of degree of freedom in obtained. The placement of the hydraulic cylinders in relation to absorber 101 and base platform 103 allows the absorber to predominantly operate in the surge, heave, and pitch degrees of freedom (DOF). This is enabled by placing the joints on the absorber 101 in a way that creates a lever with respect to the two neutral symmetry axis of the absorber, e.g. the surge extraction is affected by the lever distance from the neutral axis of the absorber that is perpendicular to the wave propagation direction.

In one embodiment, one function of the base platform 103 is to reduce, and potentially minimize, motion induced by 1) wave excitation load/water particle motion around the structure and 2) the reaction forces of hydraulic cylinders 102. A secondary function of base platform 103 is to house the hydraulic power conversion chain in a central concealed chamber including the accumulators, hydraulic motors and mechanical consumers such as, for example, a generator.

In one embodiment, platform 104 provides the reaction forces for extending PTO units through four taut mooring lines 105 into anchors 106 that are embedded in the seafloor. The four corners of platform 103 house winches (not shown) that are connected to the taut mooring lines 105 that are spread out diagonally and connect to anchors 106. In one embodiment, all mooring lines 105 are connected to base platform 104 via submersible lock winches, thereby allowing the adjustment of active line lengths to change the operating depth of the device. The winches can also be locked for high holding capacity during operation. Suitable anchors 106 include a direct embedment anchor, a vertical load anchor, a suction anchor, a driven pile or micro pile anchor or a gravity anchor, etc.

To enable efficient power extraction, one task of base platform 103 is to provide the opposing force for the double acting hydraulic cylinder 102 of the PTO units attached to it. In one embodiment, while positive PTO forces (e.g., a positive heave, PTO extension) are guided along the shortest path into taut mooring lines 105 and anchors 106, the negative PTO counter forces (PTO compression) are provided by the mass and hydrodynamic inertia as well as the net positive buoyancy from the platform's integrated ballast tanks, ultimately enabling double acting power extraction. Shadowed by absorber body 101, platform 103 operates deeper and is designed to show a reduced, potentially minimal, hydrodynamic response to the occurring wave spectrum. Hence, wave excitation forces acting on base platform 103 may be orders of magnitude smaller than for absorber body 101 in any degree of freedom.

The forces of hydraulic cylinders 102 on base platform 103 have vertical and horizontal components. In one embodiment, hydraulic cylinders 102 are mounted to face each other in a way that a positive horizontal force vector of a front hydraulic cylinder opposes the negative horizontal force vector of a back hydraulic cylinder. Residual horizontal forces can be transferred through the angled taut mooring lines 105 into the anchors 106 and the ocean floor. Positive vertical force vectors induced by cylinders 102 on platform 103 are also transferred through taut mooring lines 105 into the anchors 106. Negative vertical force vectors induced by cylinder 102 on platform 103 are opposed by the positive vertical force caused by buoyancy created by the ballast system as well as the mass and hydrodynamic inertia of platform 103.

In one embodiment, the volume of the ballast system is designed in a way that the highest negative vertical force, wave and PTO induced moments in all directions on base platform 103 does not exceed a positive vertical force ensuring taut mooring lines 105 stay taut at all times to prevent snapping loads caused by a slack taut mooring line 105.

Positive and negative moments on platform 103 created by cylinder induced loads with a lever from the neutral axis of the platform are also compensated through taut mooring lines 105 into anchors 106 as well as the distributed positive load of the buoyancy.

Relative motion between the absorber 101 and base platform 103 results in the conversion of mechanical to hydraulic energy through the cylinders 102 of the PTO units which charge a closed-loop hydraulic circuit. In one embodiment, the hydraulic circuit is housed in an isolated chamber (not shown) that is integrated into platform 103 and is accessible during maintenance through a hatch integrated in absorber 101 that can be opened and passed when locked to base platform 103 to access the chamber.

In one embodiment, the generated hydraulic flow at the given operating pressure inside each cylinder 102 is rectified with hydraulic check valves that feed into a closed loop hydraulic circuit and the pressurized fluid is collected in an accumulator bank (not shown). Since the time-series of the flow that is generated by the cylinders is directly coupled to the sum of the relative displacement of the pistons of cylinders 102, the produced flow fluctuates similar to the irregular motion of the absorber induced by the irregular motion of the ocean. In one embodiment, one function of the accumulators is to smooth out this irregular flow to a steady flow at set operating pressure and another function is to temporarily store the mechanical power as energy in the form of pressurized fluid.

In one embodiment, the irregular hydraulic fluid flow is rectified through check valves and the variable PTO flow of cylinder 102 is smoothened using a bank of hydraulic accumulators, which maintain a constant system pressure difference between the high and low pressure sides. The high pressure side is used to drive a hydraulic motor which in turn drives a mechanically coupled consumer such as, for example, a generator or pump, thereby converting hydraulic flow into mechanical torque and ultimately electricity or flow of a different fluid such as ambient seawater in the final conversion step. That is, the accumulators are discharged over a hydraulic motor that generates the desired consumer torque. The low pressure side includes a reservoir that back feeds the cylinders through the check valves. In one embodiment, the accumulators also include a control system with a processor and programming that is configured to monitor and control hydraulic system pressures and power generation.

In an alternative embodiment, energy is stored in an intermediate stage in capacitors or batteries. One function of these electrical energy storage devices is to smooth power flow from the PTO to the power export cable. Another possible function is to store energy to be returned to the PTO to control the force acting on the absorber according to a control signal provided by a controller.

In one embodiment, the control system also monitors and controls the absorber load through aperture, hydraulic pressure and winch control. The controller may also monitor resonance and overall apparatus buoyancy.

In one embodiment, an umbilical cable is used to transfer electricity to the shore and the grid. In another embodiment, pressurized fluid is transported to the shore where it can perform work such as generating electricity.

For towing, installation and failure cases, absorber 101 and platform 103 can be mechanically locked creating a hydrodynamic stable system. In one embodiment, this is accomplished by having the hydraulic cylinders actively pulled in to their shortest extension, causing absorber to be pulled into a lock. In this mode, the wave energy converting apparatus is not converting wave energy to mechanical power, the motion and excitation load is desired to be reduced to its minimum.

A number of alternative embodiments of a wave energy converter apparatus are described below. These embodiments have some similarly named and numbered components that operate and/or function as other like named components in other embodiments except where noted.

Figure 2B:
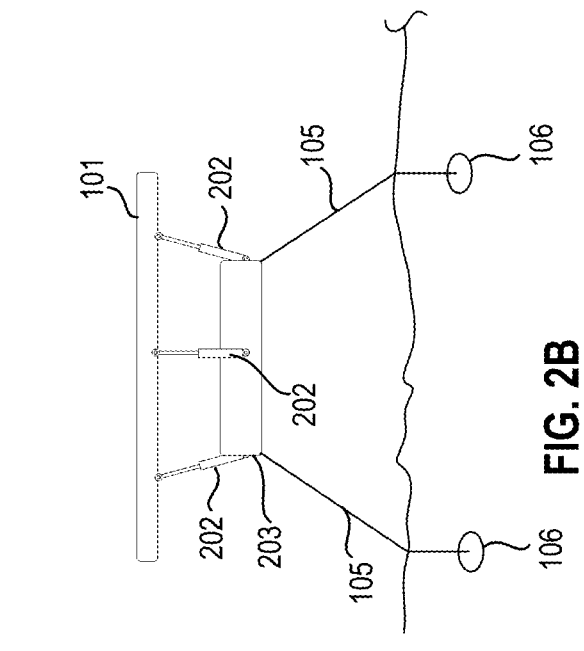
Figure 2A:
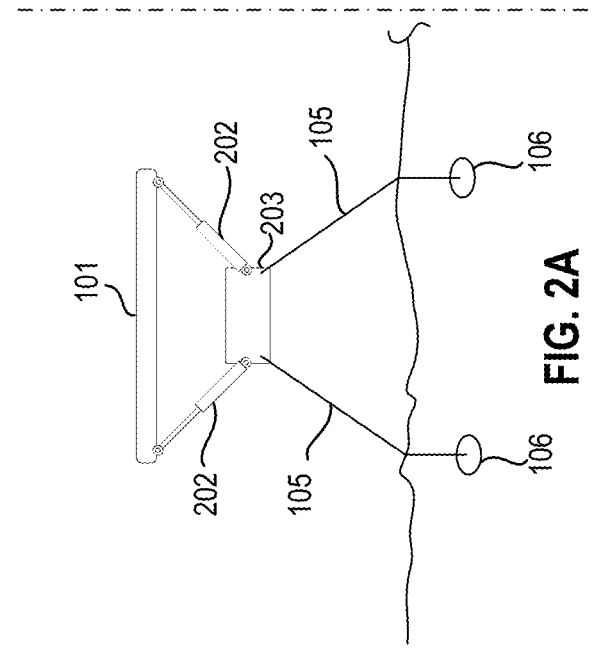

FIGS. 2A-C illustrate side, front and top views, respectively, of an alternative embodiment of a wave energy converter apparatus. Referring to FIGS. 2A-C, two downstream located hydraulic cylinders 202A and 202B are oriented diagonal outwards from platform 203 to the upper body of absorber 101 and connected via joints while one upstream hydraulic cylinder 202C is located in the geometric center (or substantially near the geometric center). At the same mounting points as the cylinder joints on the body of platform 203, the taut mooring winches are located resulting into shortest possible force flow through the platform structure from cylinder to mooring line.

Figure 3C:
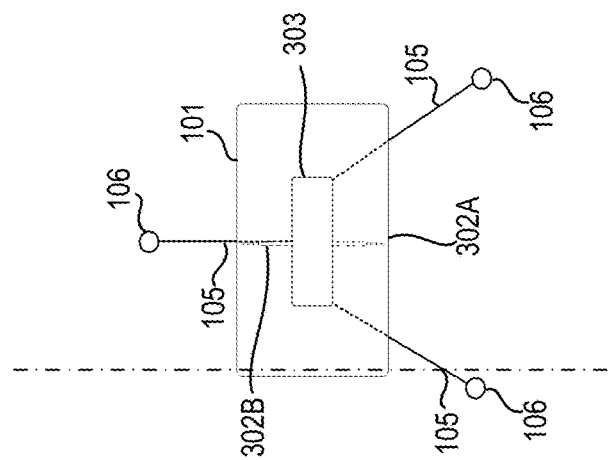
FIGS. 3A-C illustrate side, front and top views, respectively, of another alternative embodiment of a wave energy converter apparatus.
Figure 3B:
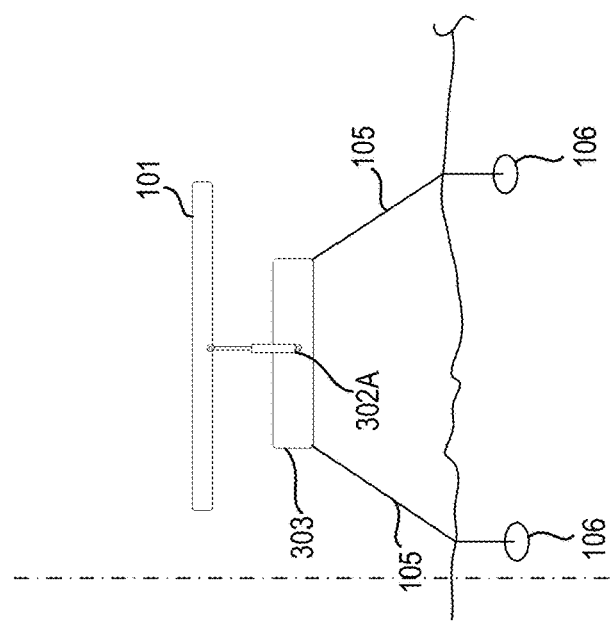
Figure 3A:
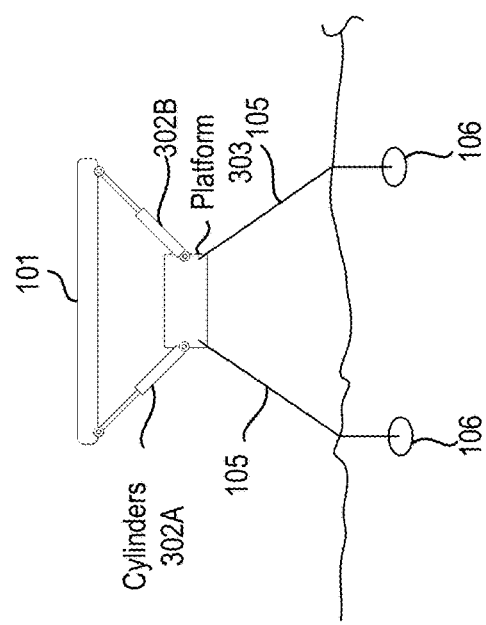

FIGS. 3A-C illustrate side, front and top views, respectively, of another alternative embodiment of a wave energy converter apparatus. Referring to FIGS. 3A-C, one downstream located hydraulic cylinder 302B is oriented diagonal outwards from platform 303 to absorber 301 and connected via joints and one upstream hydraulic cylinder 303A is located in the geometric center (or substantially near the geometric center).

FIGS. 4A-C illustrate side, front and top views, respectively, of another alternative embodiment of a wave energy converter apparatus. Referring to FIGS. 4A-C, one hydraulic cylinder 402 connects platform 403 and absorber 401 via joints in the geometric center of both. Three taut mooring line winches (not shown) are coupled to three taut mooring lines 405 and are oriented diagonally outwards to provide stability of the platform in all directions.

Figure 5A:
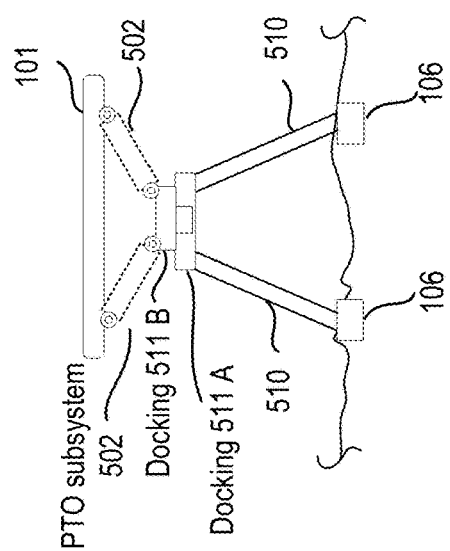
FIGS. 5A-C illustrate side, front and top views, respectively, of another alternative embodiment of a wave energy converter apparatus.
Figure 5B:
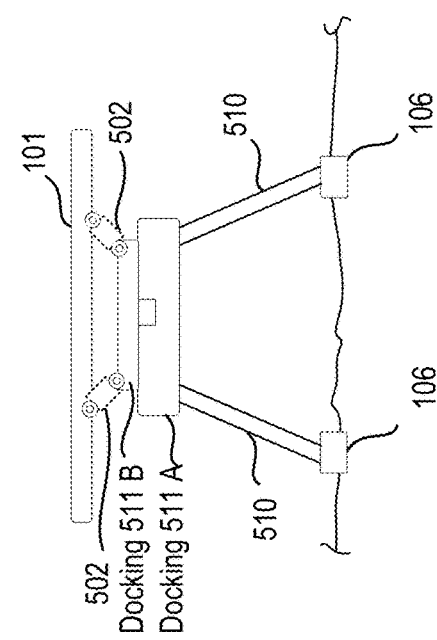
Figure 5C:
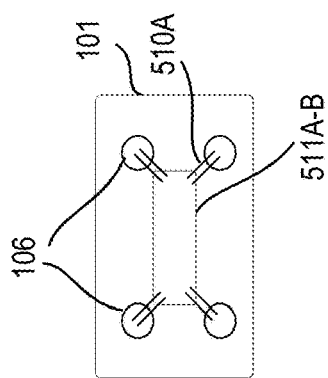

FIGS. 5A-C illustrate side, front and top views, respectively, of another alternative embodiment of a wave energy converter apparatus. Referring to FIGS. 5A-C, the wave energy converter apparatus has a configuration with 1, 2, 3 or 4 PTOs such as, for example, hydraulic cylinders similar to the embodiments in FIGS. 1A-4C, and have not been shown to avoid obscuring other aspects of the wave energy converter apparatus. The cylinders connect platform 503 and absorber 101 via joints. A rigid mounting structure 511A with legs such as, for example, mooring tendons, truss, or pile structures 510A is connected to an anchor on the seafloor that provides stability to the platform in all directions including positive and negative vertical loads. No buoyancy in the platform is needed as the tendons can act in tension and compression. A mechanical link connects a docking mount 511B to the mounting 511A. Platform 511B is the mounting point for cylinders and contains the power conversion chain and the cable connection.

In one embodiment, absorber 101 and platform 511B can be disconnected from the rigid mounting platform 511A together for installation, maintenance and decommissioning.

FIGS. 6A-C illustrate side, front and top views, respectively, of another alternative embodiment of a wave energy converter apparatus. Referring to FIGS. 6A-C, the wave energy converter apparatus has a configuration with 1, 2, 3 or 4 PTOs such as, for example, hydraulic cylinders similar to the embodiments depicted in FIGS. 1A-4C, and have not been shown to avoid obscuring other aspects of the wave energy converter apparatus. The cylinders connect platform 603 and absorber 101 via joints. One or multiple mono piles or truss structures 620 provide stability to platform 611 in all directions including positive and negative vertical loads. In one embodiment, no buoyancy in platform 611A is needed as the pile/truss 620 can react in tension and compression. In one embodiment, a mechanical link connects a platform of mono pile 611A and docking 611B. Docking platform 611B is the mounting point for cylinders and contains for power conversion chain and cable connection.

In one embodiment, absorber 101 and docking platform 611B can be disconnected from the platform of mono pile 611A together for installation, maintenance and decommissioning. No anchor is needed as mono pile 620 also acts like an anchor.

In one embodiment, each power takeoff unit of the wave energy converting apparatus, such as those of FIGS. 1A-C to 6A-C, comprises linear generators or rack and pinion mechanical assemblies connected to rotary generators and provide restoring force and damping forces acting on the body of absorber 101. Examples of power takeoff units that may be used in the embodiments described herein are shown in FIGS. 18-21. Note that PTOs with belts or mooring lines can only be used for single acting, and double acting configurations can also be used in single acting fashion.

Figure 10C:
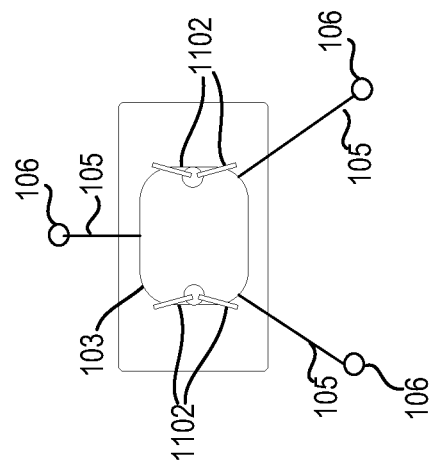
FIGS. 10A-C illustrate side, front and top views, respectively, of yet another embodiment of a wave energy converter apparatus that includes an absorber, a platform and one or more mooring chains.
Figure 10B:
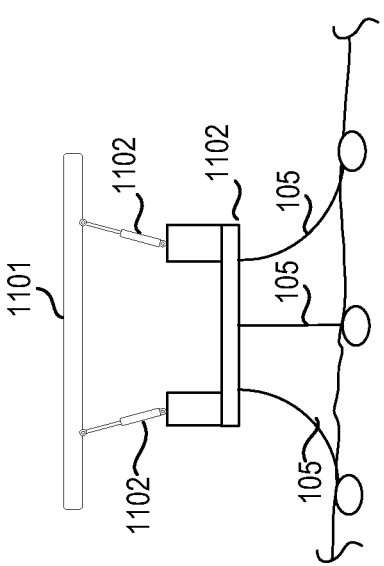
Figure 10A:
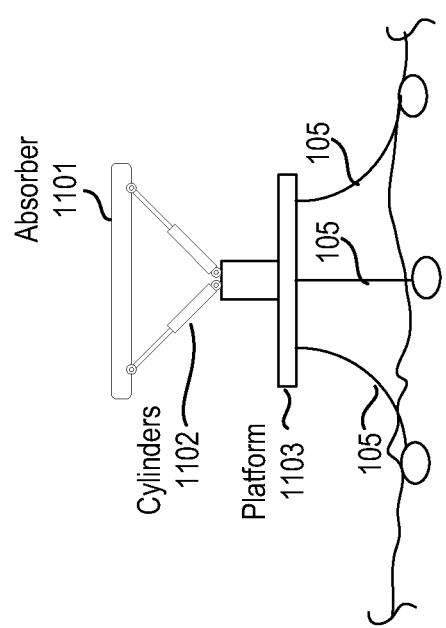

FIGS. 10A-C illustrate side, front and top views, respectively, of yet another embodiment of a wave energy converter apparatus that includes an absorber, a platform and one or more mooring chains. Referring to FIGS. 10A-C, absorber 1101 may be configured with 1, 2, 3 or 4 cylinders 1102 similar to the embodiments described above. Each of the cylinders 1102 is coupled platform 1103 and absorber 1101 via joints. Three or more catenary mooring chains 1105 are coupled to platform 1103. In one embodiment, platform 1103 is buoyant and rests in the mid water column in equilibrium between weight of the chains 1105 and buoyancy.

In one embodiment, one or more drag plates (not shown) are coupled to platform 1103 to increase the hydrodynamic added mass of platform 1103. The mass and added mass inertia of platform 1103 provide the reaction force to cylinders 1102 in operations and stability to platform 1103 in all directions including positive and negative vertical loads.

Figure 7C:
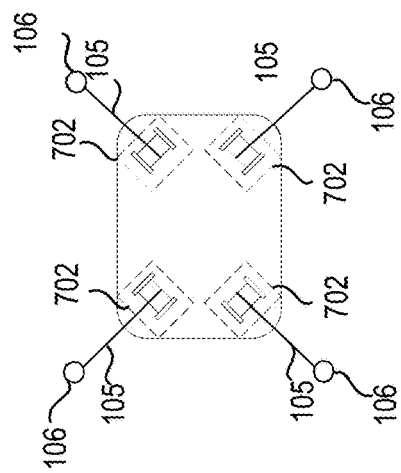
FIGS. 7A-C illustrate side, front and top views, respectively, of an embodiment of a wave energy converter apparatus that includes an absorber without a platform.
Figure 7B:
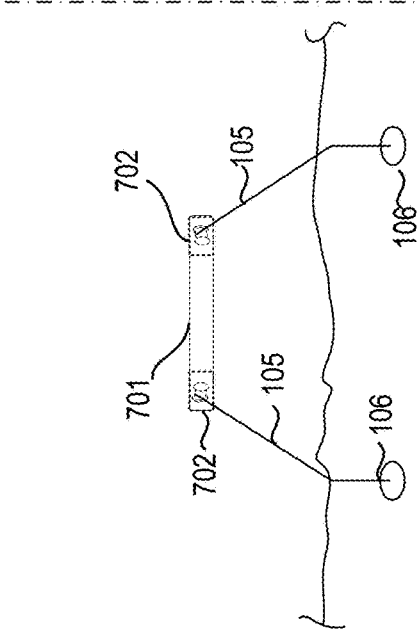
Figure 7A:
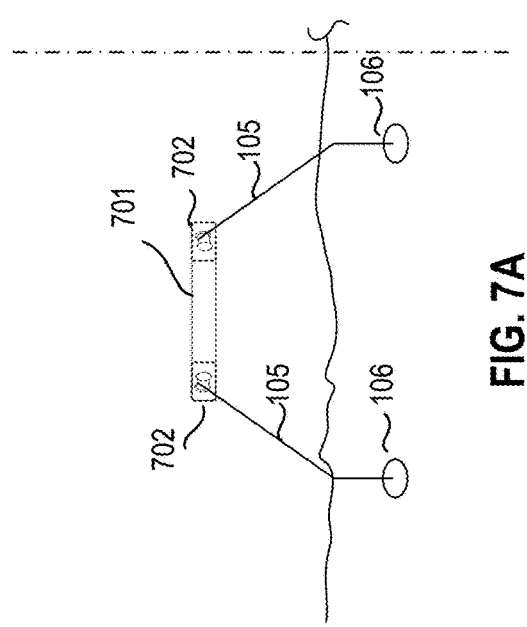

FIGS. 7A-C illustrate side, front and top views, respectively, of an embodiment of a wave energy converter apparatus that includes an absorber without a platform. Referring to FIGS. 7A-C, the wave energy converter apparatus can be configured to include 1, 2, 3 or 4 hydraulic cylinders 702, which are similar to those described above, and that are part of PTOs that are connected to a single absorber body 701 through hinges on one side and connected to taut mooring lines 105 on the other side. In one embodiment, each mooring line 105 is pointed diagonally downwards and connected to an anchor 106 (e.g., a direct embedment anchor, a vertical load anchor, a suction pile, etc.).

In one embodiment, each taut mooring line 105 is connected to at least one PTO unit, referring to FIGS. 18A-G, which includes a restoring force mechanism and a damping mechanism that operate in parallel. This configuration allows energy extraction from multiple degrees of freedom, primarily heave, surge, and pitch motion. The restoring force mechanism integrated into each of the PTO units provide a restoring force to bring absorber 701 back to its neutral position once displaced.

Figure 8C:
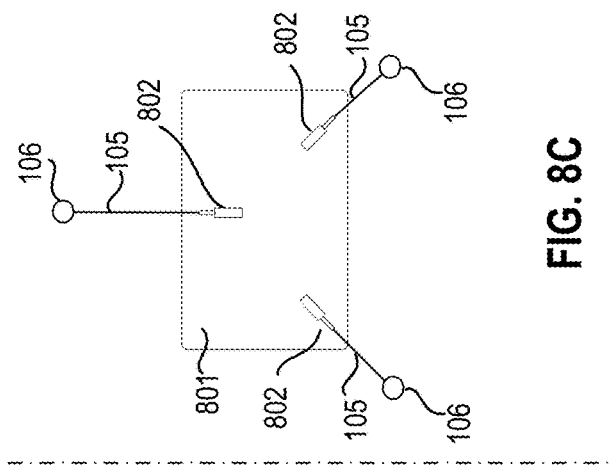
FIGS. 8A-C illustrate side, front and top views, respectively, of another embodiment of a wave energy converter apparatus that includes an absorber without a platform.
Figure 8B:
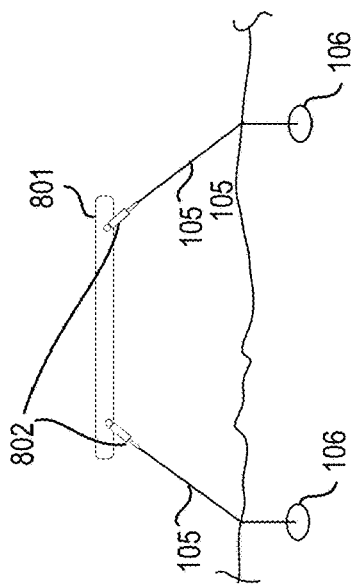
Figure 8A:
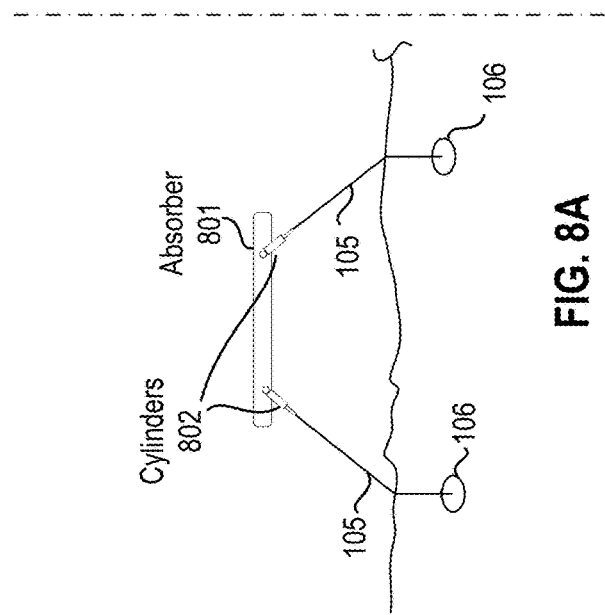

FIGS. 8A-C illustrate side, front and top views, respectively, of another embodiment of a wave energy converter apparatus that includes an absorber without a platform. Referring to FIGS. 8A-C, the wave energy converter apparatus can be configured to include 1, 2, 3 or 4 hydraulic cylinders 802, which are similar to those described above, and that are part of PTOs that are embedded into a single absorber body of an absorber 801 and connected to taut mooring lines 105. In one embodiment, each mooring line 105 is pointing downwards to the seafloor and connected to an anchor 106 (e.g., a direct embedment anchor, a vertical load anchor, a suction pile, etc.).

In one embodiment, each taut mooring line 105 is connected to at least one PTO unit, which includes a restoring force mechanism and a damping mechanism that operate in parallel. This configuration allows energy extraction from multiple degrees of freedom, primarily heave, surge, and pitch motion. A restoring force mechanisms integrated into each of the PTO units connected to the cylinders provides a restoring force to bring absorber 801 back to its neutral position once displaced.

Figure 9C:
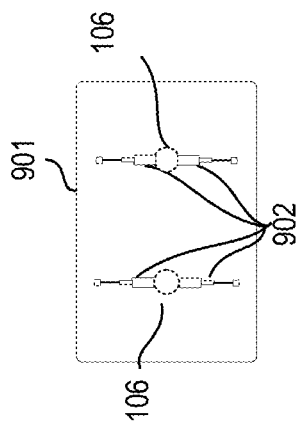
FIGS. 9A-C illustrate side, front and top views, respectively, of another embodiment of a wave energy converter apparatus that includes an absorber without a platform.
Figure 9B:
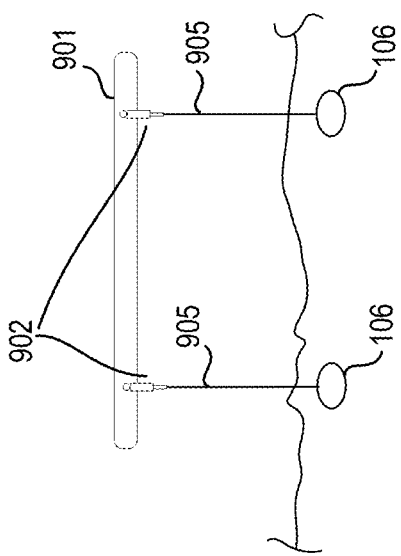
Figure 9A:
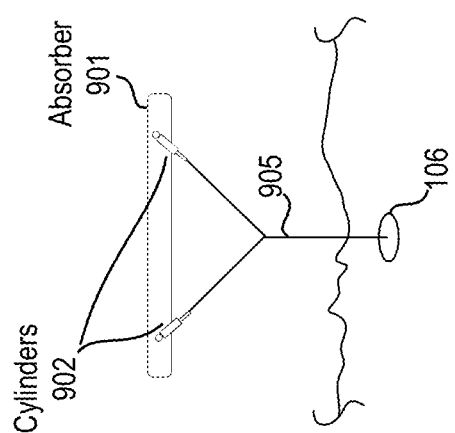

FIGS. 9A-C illustrate side, front and top views, respectively, of another embodiment of a wave energy converter apparatus that includes an absorber without a platform. Referring to FIGS. 9A-C, the wave energy converter apparatus can be configured to include 1, 2, 3 or 4 hydraulic cylinders 902, which are similar to those described above, and that are part of PTOs that are embedded into a single absorber body of an absorber 901 and connected to taut mooring lines 105. Two or four of cylinders 902 are aligned in a downwards pointing orientation and the taut mooring lines connect to a junction point leading to one shared vertical mooring line 905 that connects to one or two anchors, such as anchor 106.

In one embodiment, each taut mooring line 905 is connected to at least one PTO unit, which includes a restoring force mechanism and a damping mechanism that operate in parallel. This configuration allows energy extraction from multiple degrees of freedom, primarily heave, surge, and pitch motion. In one embodiment, the restoring force mechanism integrated into each of the PTO units coupled to the cylinders provides a restoring force to bring absorber 901 back to its neutral position once displaced.

Figure 12:
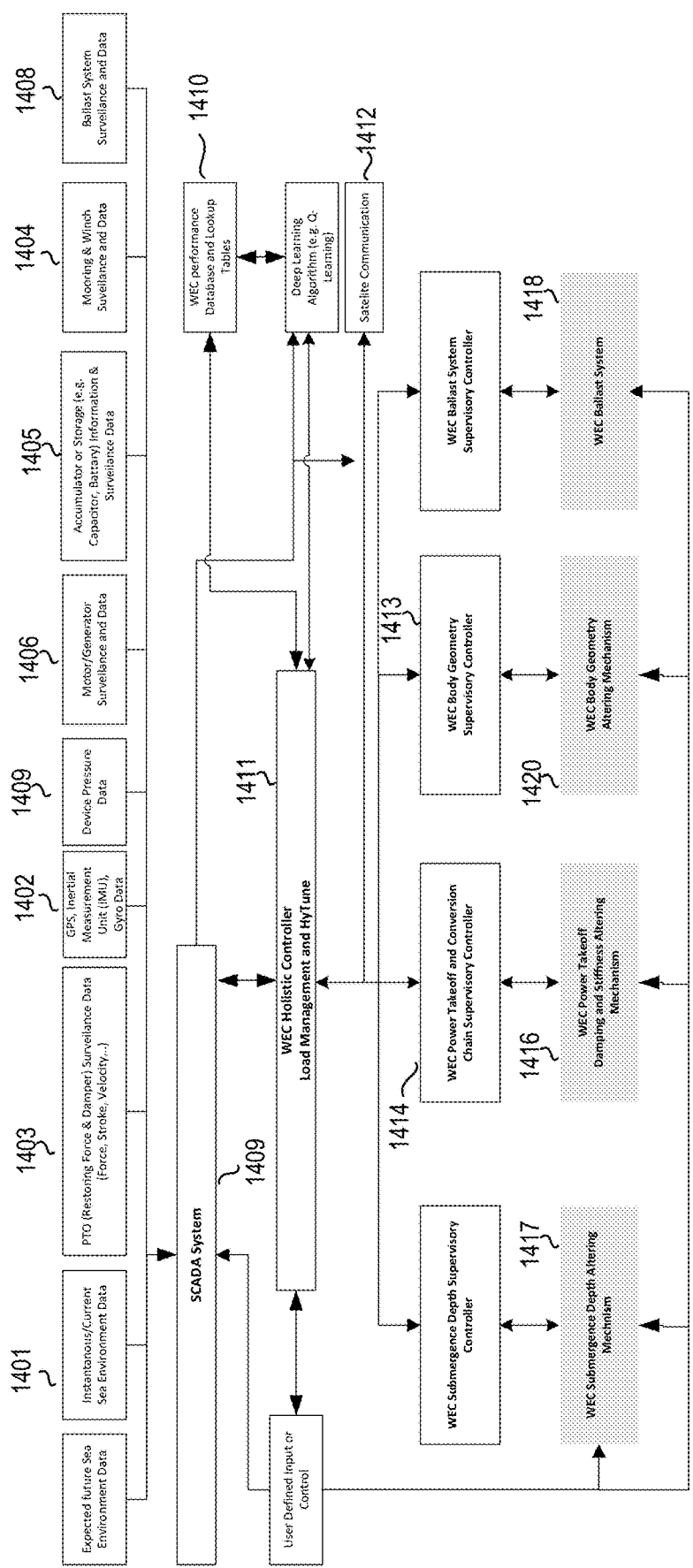
FIG. 12 is a block diagram of one embodiment of an interface controller for a wave energy converter apparatus including interaction between controller input and output sources, functionalities and data.
Figure 13:
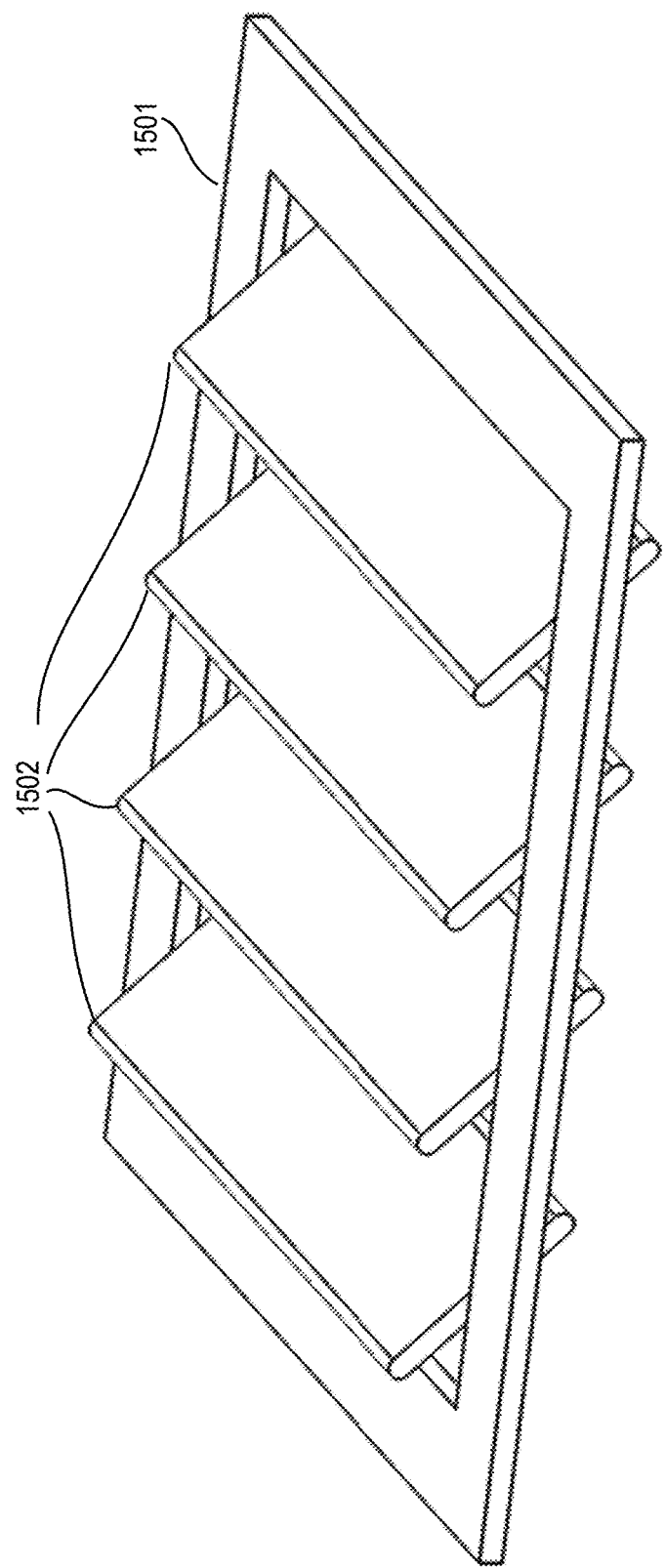
FIG. 13-16 are active and passive aperture opening and closing control mechanisms that includes apertures that may be opened and closed.
Figure 14:
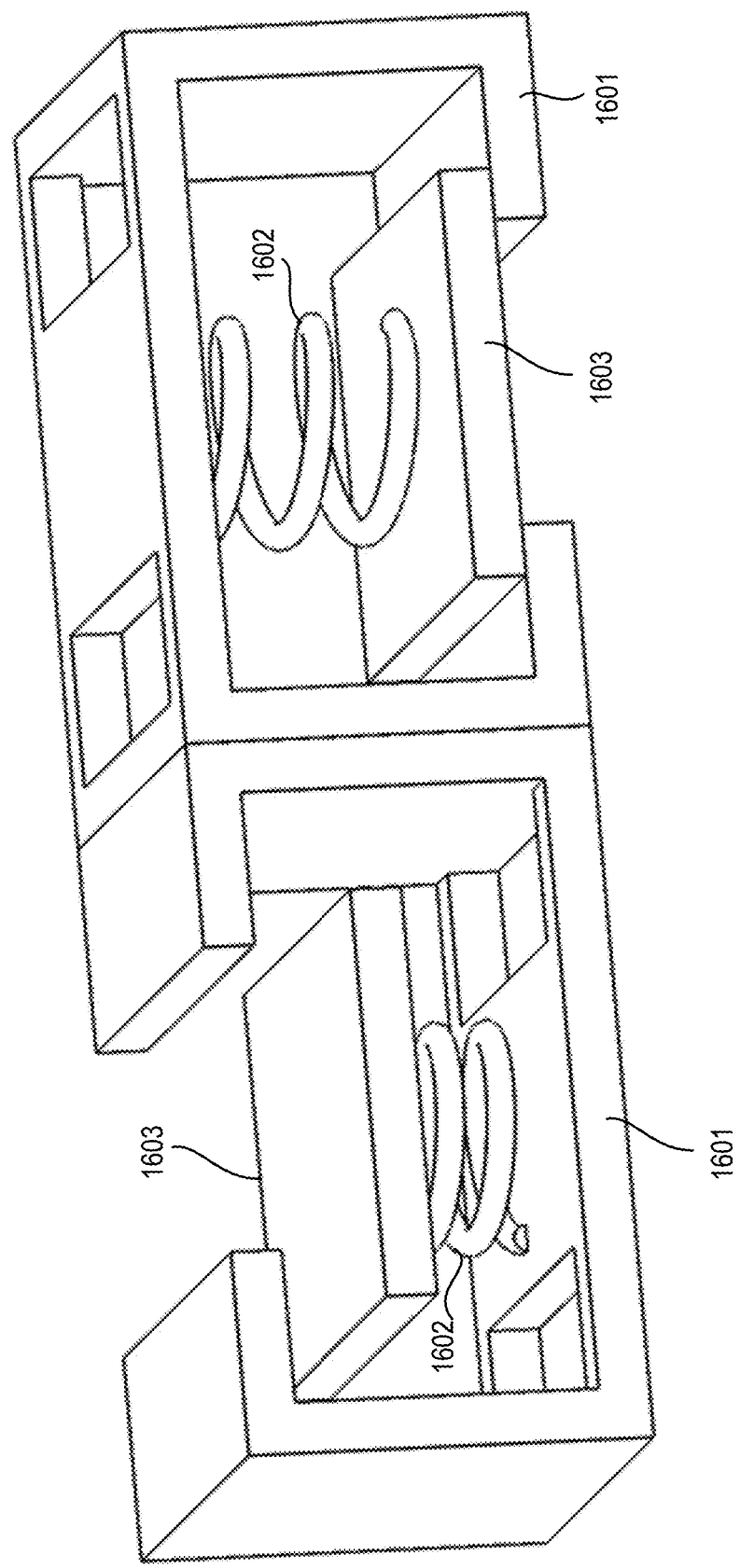
Figure 15:
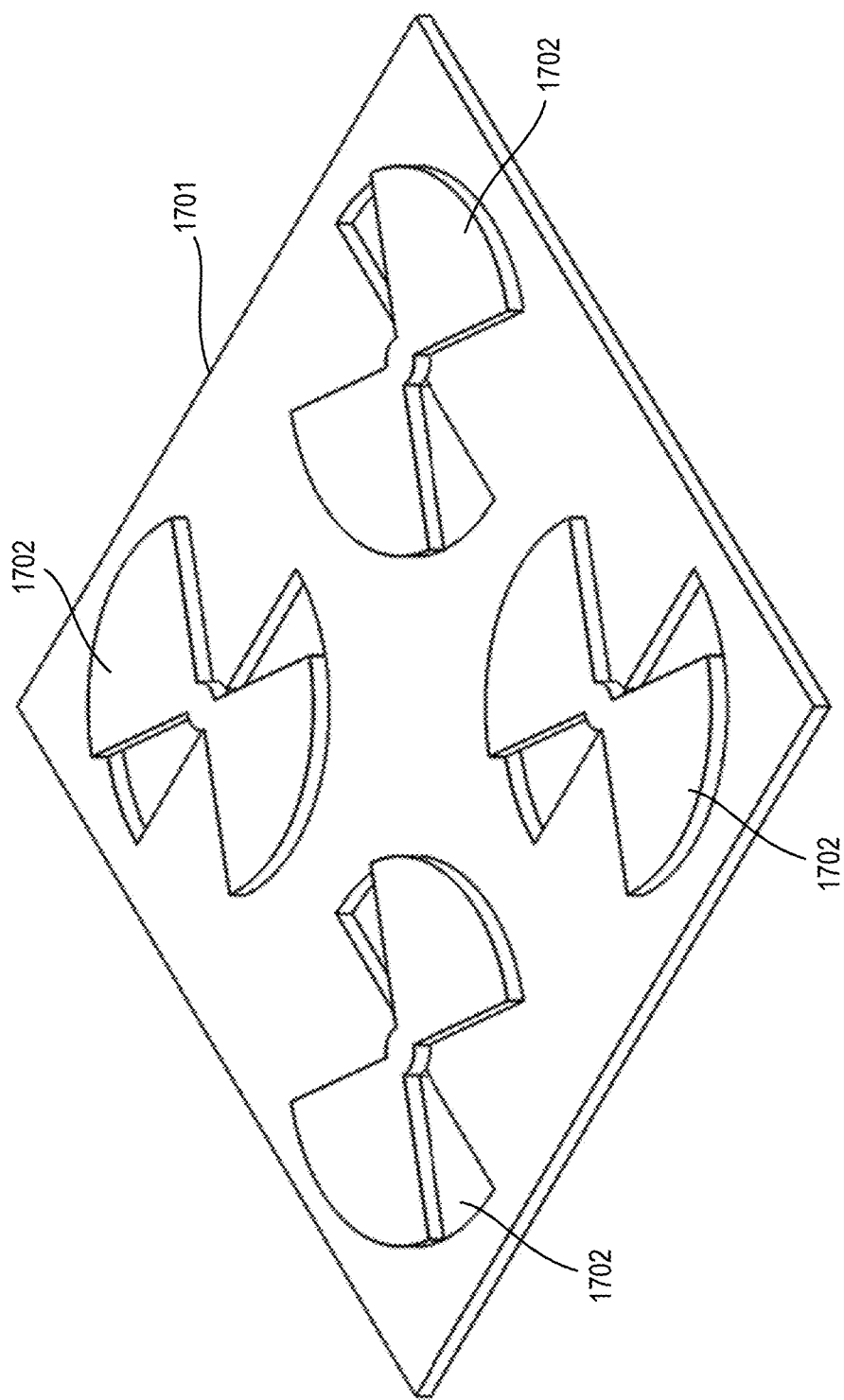
Figure 16:
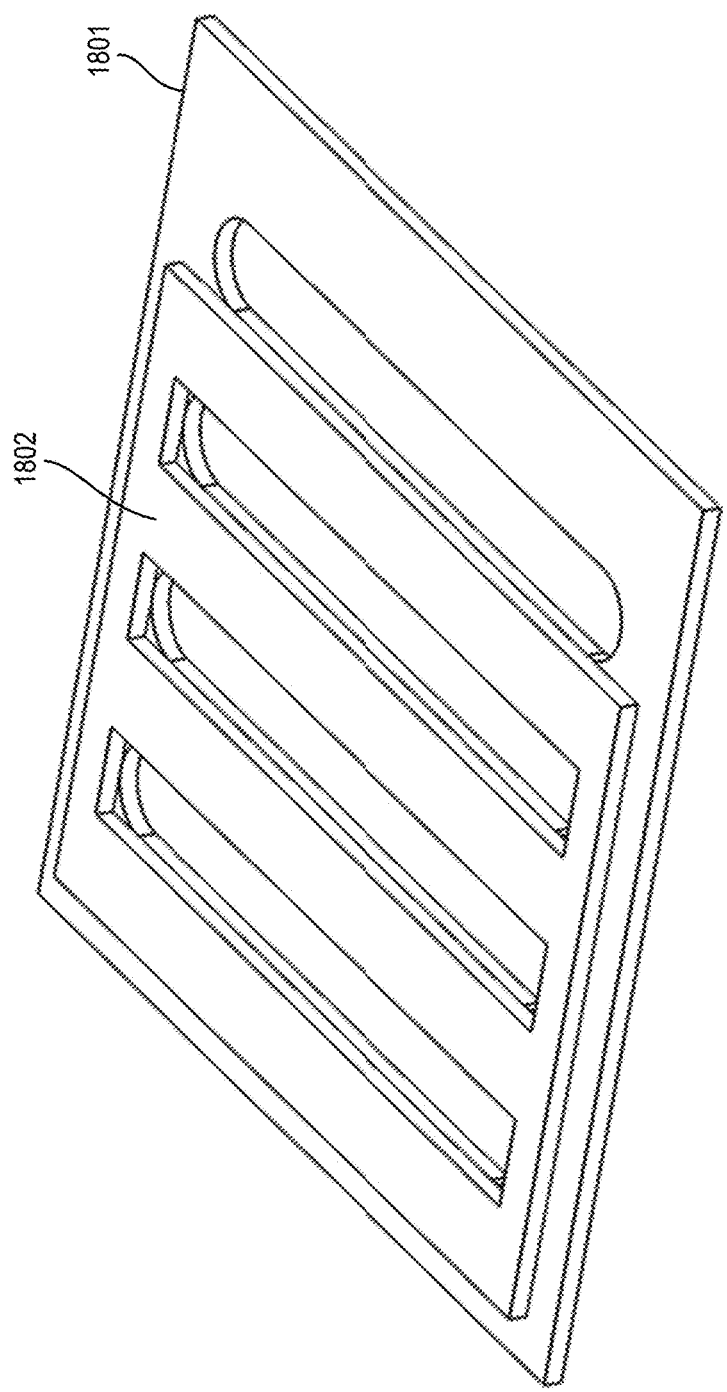

FIG. 12 illustrates one embodiment of a control system for a wave energy converter apparatus, such as the various embodiments of a wave energy converter apparatus disclosed herein. The control units and modules of FIG. 12 are described in more detail below.

FIG. 13 through FIG. 16 are active and passive aperture opening and closing control mechanisms. In one embodiment, the one or multiple of these aperture control mechanisms is embedded into the absorber.

The use of the apertures of FIGS. 13-16 enable the area of the wave energy converter apparatus subject to wave excitation to be controlled to both avoid sudden, extreme spikes in structural loads as well as to optimize energy harvesting conditions. Given the complex interactions and changing requirements for ideal energy harvesting, the apparatus includes a mechanism for adjusting to changing wave conditions and to handle sudden, extreme load spikes. This mechanism helps manage the highly variable loading imposed on the apparatus at several time scales by changing sea states, superposition of waves, and the relative position of the apparatus.

More specifically, in one embodiment, one or more absorber body apertures, such as shown in FIGS. 13-16, are included in the absorber. The motive force created on the absorber is principally due to the locally-varying and time-varying propagating pressure field differences between the regions above and below the absorber. These pressure differences exist only because of the separation imposed by the absorber. Locally canceling this pressure difference, for example, by use of controlled apertures in the absorber can effectively and substantially reduce the overall structural load on the absorber, thereby also reducing the load on the supporting structural elements of the wave energy converter apparatus. Once opened, the apertures allow a direct pressure exchange between fluid above and underneath the absorber body. In the case of passive (e.g., pressure activated) apertures, different passive cracking pressures limit when to actuate the mechanisms and the time to actuate the mechanisms can be set differently for different aperture units. Note that in one embodiment, for passive apertures, no input from pressure sensors is required for activation. In one embodiment, a passive activation mechanism to control the opening and closing of the passive apertures comprise a mechanism driven directly by environmental parameters such as wave pressure compared to signal sent from central controller.

Active aperture closures include controlled rotary closures or linear closure mechanisms. Passive and active mechanisms can be implemented in the same aperture mechanism or independently.

By varying coverage of at least one aperture embedded in the absorber, the pressure differential can be effectively short-cut with varying intensity. Through immediate and active control of one or more apertures in the absorber body, the body hydrodynamics can be tuned to increase, and potentially maximize performance, in a given sea state. Additionally, this load control strategy, implemented in the primary conversion stage, allows for lean apparatus structural designs and device components by allowing load bearing elements to be sized according to the demands of the energy absorbing operating states, rather than by storm conditions. Moreover, this control mechanism enables effective wave energy absorption for variable significant wave height. By actively controlling the active area of the absorber actuation of such control apertures of FIGS. 13-16, the wave energy converter apparatus can achieve improved performance without the accompanying risk of overload conditions and peak loads.

In one embodiment, the wave energy converting apparatus includes other control mechanisms to manage loads, including but not limited to, control over physical settings of the damping and restoring elements of the power conversion chain system; control over the dynamic responses of damping and restoring elements of the power conversion chain system; and control over the operating depth of the wave energy converting apparatus, or portion thereof.

In one embodiment, PTO units are included in the absorber and have restoring and dampening elements that are controlled. In one embodiment, the PTO units are controlled by controlling the hydraulic fluid flow. In one embodiment, the control over the hydraulic fluid flow using a combination of check valves and actively controlled solenoid valves, proportional valves and an accumulator bank allows the system to maintain and control constant pressures and thus constant cylinder damping forces. The two chambers of a hydraulic cylinder can be directly short-cut leading to a fast reduction of damping force on the shaft and absorber.

A scheme where multiple discrete pressure levels can be achieved to approximate linear damping force characteristics that are proportional to cylinder velocity may be achieved by using accumulators at different pre-charge pressure levels. This allows damping of multiple cylinders to be controlled independently while centralized hydraulic components are still shared. Alternatively, linear damping force characteristics can be approximated with a single centralized accumulator pressure and varying active hydraulic cylinder piston area in each PTO.

In addition to its load control capabilities, in one embodiment, the PTO units are passively controlled. As waves excite the absorber body, the constrained kinematics of the device setup inherently alter the hydraulic cylinder angles and thus, restoring force (k) and damping properties (c) in each of the main degrees of freedom. This nonlinear effect facilitates a self-adapting device response over a broad wave frequency and height spectrum. This change in damping and restoring forces during one closed absorber oscillation cycle can be specifically designed to contribute to the efficient operation of the wave energy converter apparatus.

Figure 17:
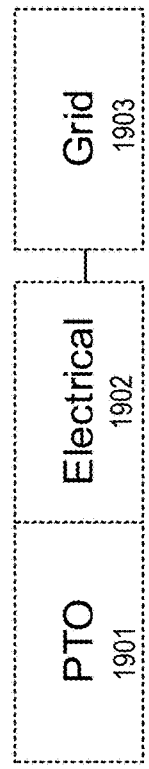
FIG. 17 illustrates a block diagram of a power conversion chain containing one or more PTOs.

FIG. 17 illustrates a block diagram of a power conversion chain containing PTOs. Referring to FIG. 17, PTO subsystem 1901 is electrically connected to electrical subsystem 1902. Electrical subsystem 1902 is electrically connected to grid 1903. In one embodiment, electrical subsystem 1902 is part of a wave energy converter apparatus that contains PTO subsystem 1901. In another embodiment, all or a portion of electrical subsystem 1902 is not part of an energy converter apparatus that contains PTO subsystem 1901.

FIGS. 18A-G illustrate one embodiment of a wave energy converter apparatus that includes more than one PTO subsystem (unit). Referring to FIGS. 18A-G, an absorber 701 contains four PTO subsystems 702 coupled to taut mooring lines 105. PTO subsystems 702 may be used in wave energy converter apparatuses, such as those, for example, described in FIGS. 7A-C, 8A-C and 9A-C.

Note there are a number of PTO subsystem variations that may be employed. These include those acting on (e.g., pulling on) a single mooring line for conversion of the linear relative motion between mooring lines, wire or belt and absorber buoy to electrical energy generator. Such generators often operate with short-term energy storage such a, for example, flywheels, capacitors or batteries, to store energy generated as a result of conversion.

Examples of PTO subsystems 102 or 702 include, but are not limited to, those that execute: 1) a static spring; 2) a dynamic spring (fixed or adjustable (e.g., a time frame of day, sea state, etc.); 3) a dynamic damper (e.g., adjustable (e.g., a time frame of day, sea state, etc.). In one embodiment, these PTO subsystems operate by having mooring lines pulling over a drum. Examples of these includes PTO systems with a drum direct drive to one generator, a drum direct drive to multiple generators, a drum with mechanical power transmission, via toothed gearbox or belt gearbox, to one or multiple generators, etc. In other embodiments, these PTO subsystems operate by having mooring lines pulling on rack and pinion, mooring lines pulling on a lead screw, mooring lines pulling on a linear generator, and mooring lines pulling on a hydraulic cylinder.

Figure 18D:
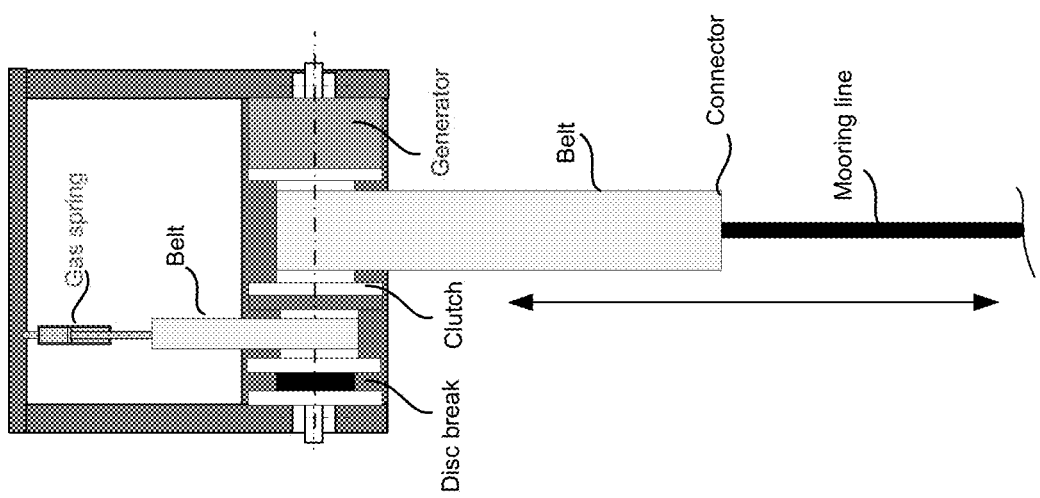
FIGS. 18A-G, 19A-B, 20A-B, and 21A-B illustrate examples of PTO subsystems that may be used for PTO subsystems of FIGS. 1-11 (and the other wave energy converter apparatuses described herein referencing a cylinder or winch).
Figure 18B:
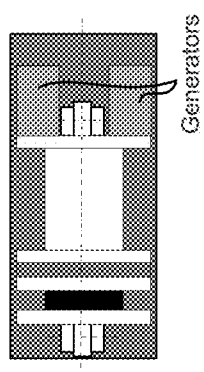
Figure 18C:
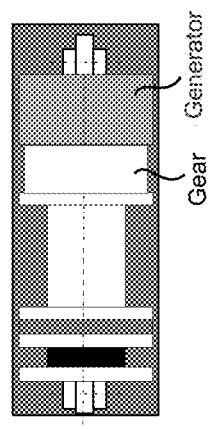
Figure 18A:
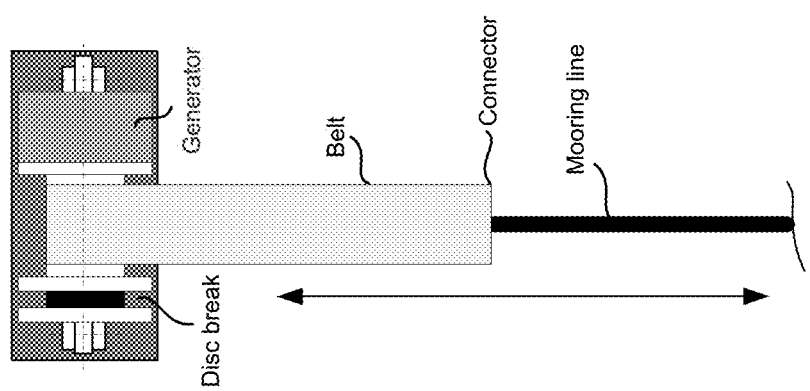

Other examples of PTO subsystems 102 or 702 include those where a gas spring (e.g., a hydraulic cylinder accumulator couple) or mechanical spring provide the static offset spring force and companying sub-system solutions provide 1) a dynamic spring force (e.g., fixed restoring force coefficient or adjustable restoring force coefficient or 2) a dynamic damping force. In one embodiment, these PTO subsystems operate by having mooring lines pulling over a winch drum. FIGS. 18A-C describes examples of PTO systems with a drum direct drive to one generator, a drum direct drive to multiple generators, a drum with mechanical gearbox or belt transmission to one or multiple generators, etc., where all forces are provided by the generator. FIGS. 18D-G and 19-21B describe configurations where some component of the total PTO force is provided by a parallel gas spring and the additional force control is executed either by a rotary or linear generator or hydraulic cylinder. For the configuration of FIG. 18D, a clutch is added to the shaft to allow for depth adjustments. In other embodiments, referencing FIGS. 19-21, the PTO subsystems operate by having mooring lines pulling on a rack and pinion, a lead screw, a linear generator, and a hydraulic cylinder.

Figure 18G:
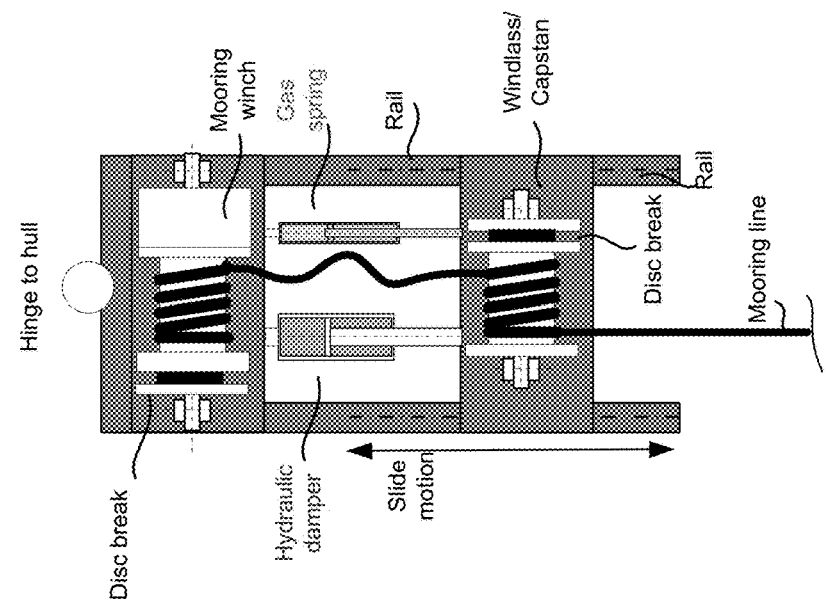
Figure 18F:
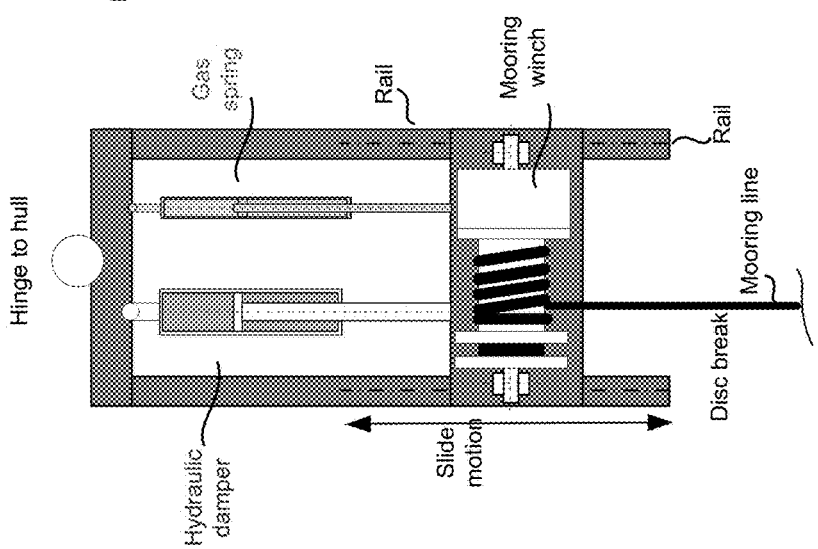
Figure 18E:
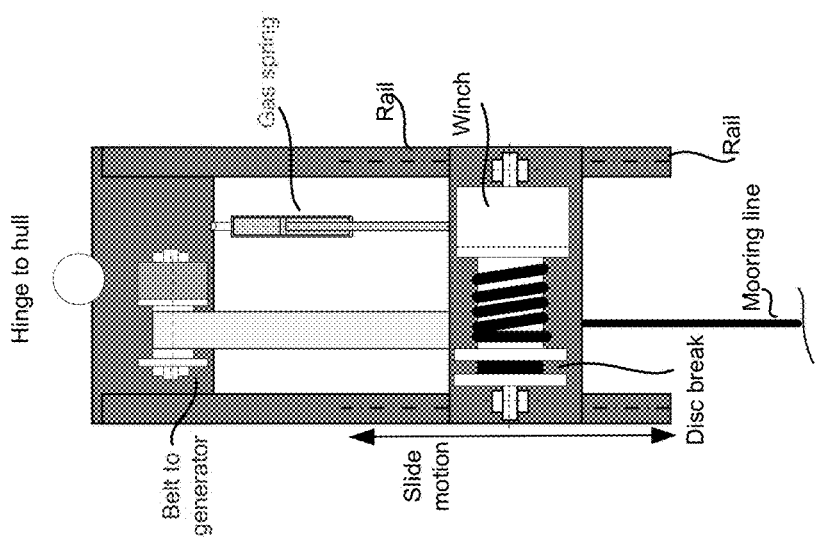
Figure 19A:
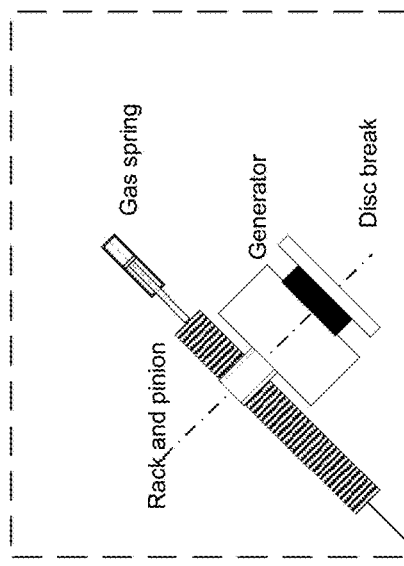
Figure 20A:
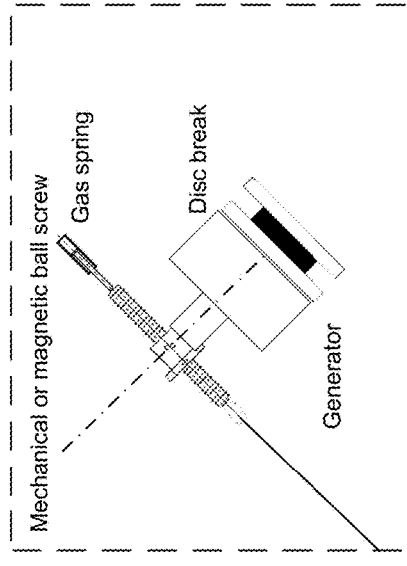
Figure 21A:
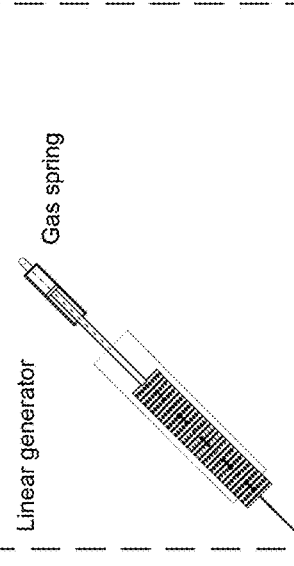
Figure 19B:
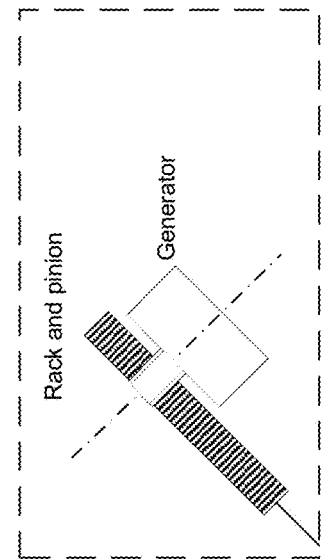
Figure 20B:
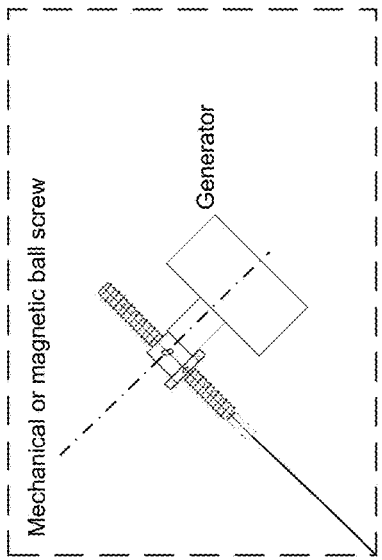
Figure 21B:
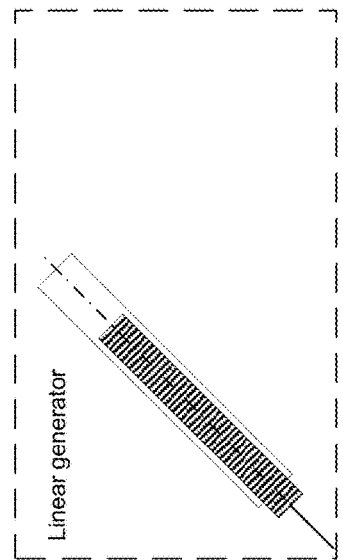
Figure 22A:
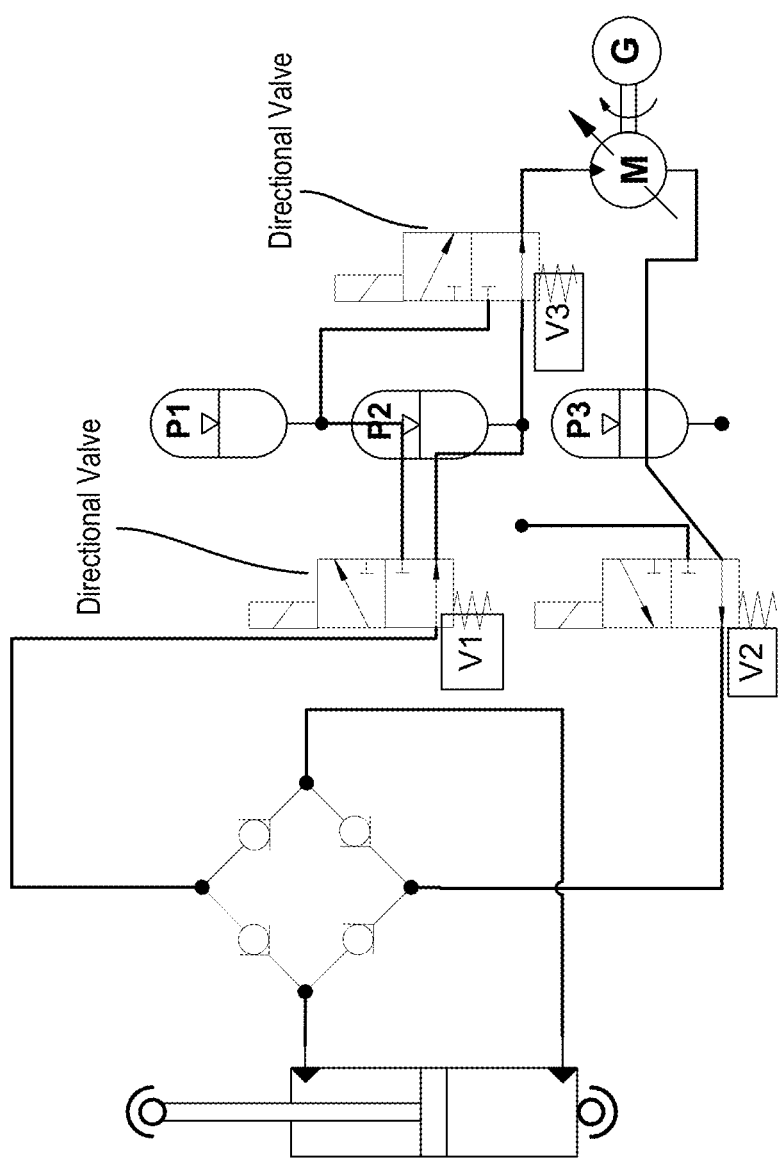
Figure 22B:
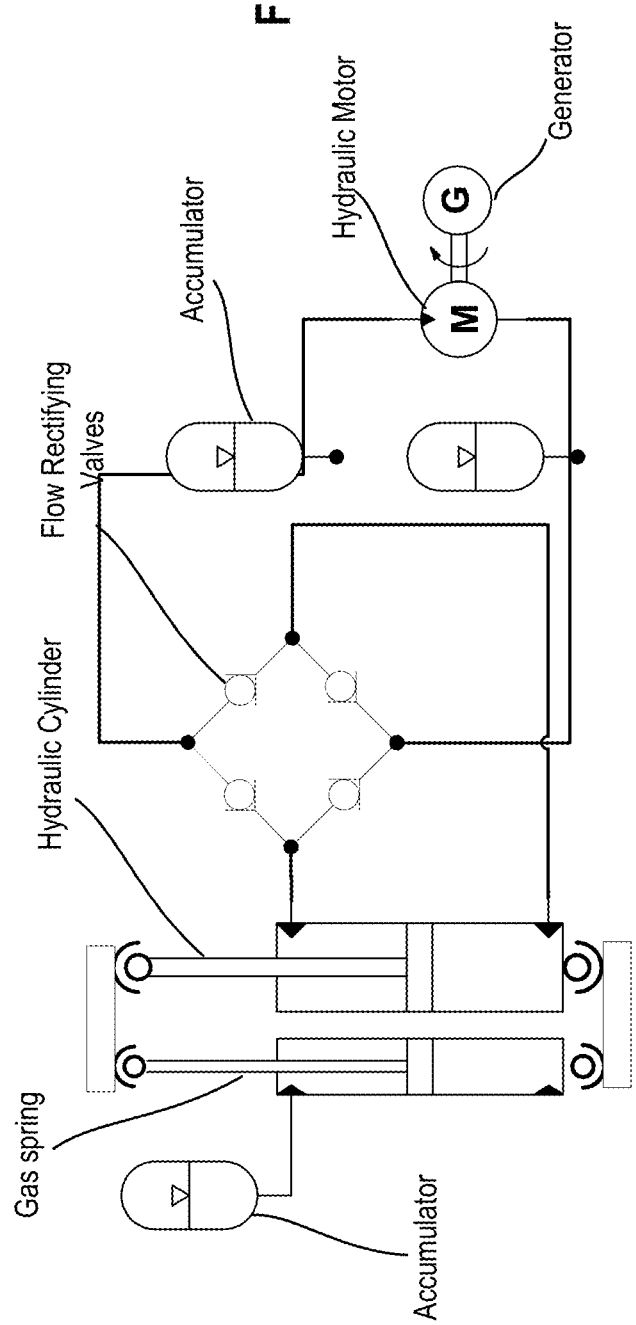

More specifically, FIGS. 18A-F, 19A-B, 20A-B, 21A-B and 22A-B illustrate examples of single acting (always in tension) PTO subsystems that may be used for PTO subsystems 702, 802, 902 of FIGS. 7, 8 and 9 respectively and the other wave energy converter apparatuses described herein. The operation of these PTO subsystems is well-known to those skilled in the art. The PTO configurations of 19A-B, 20A-B, 21A-B and 22A-B can be used as double acting PTOs for 102, 202, 302, 402 and 502. FIGS. 18E-G describe alternative configurations of the configuration in FIG. 18A replacing the belt with a synthetic mooring line that terminates on a winch drum (FIGS. 18E-F) or a capstan (FIG. 18G) that takes of the tension from the line and can be adjusted in length by a winch that is not located on the sliding table guided by rails. The configuration in FIGS. 18F-G can also be implemented without rails where only the hydraulic damper and hydraulic gas spring shafts connect to a mounting platform of the winch drum. Thus, the shafts constrain the PTO displacement and provide the same functionality as the rail. Furthermore, as commonly used in the offshore industry, one cylinder can provide both functions of the hydraulic damper and gas spring sharing the same stroke, reducing the number of cylinders in each PTO to one.

The movements of absorber hydraulic cylinders are caused as a result of heave, surge and pitch wave actions. As a result of the wave energy converter apparatus configuration, every positive and negative motion of the absorber in any degree of freedom leads to relative motion between the absorber and the base platform. This relative motion leads to a relative motion between the cylinder shafts and the cylinder housing, respectively, resulting into a displacement of the fluid inside the cylinder chamber in a double acting reciprocating motion.

In one embodiment, a resting state of the power take off units of the wave energy converter apparatus controlled by the restoring force component (e.g., a mechanical spring, an air spring, a virtual spring, etc.) is a position in which the absorber is essentially parallel with the surface of the water and the hydraulic cylinders are not compressed.

The vertical forces or heave that can be exerted on the absorber and cause the absorber to move up and down and the displacement of each of the hydraulic cylinders is essentially the same. Horizontal forces known as surge forces exerted on the absorber cause forward and backward movements of the absorber and corresponding extensions and compressions of the cylinders. Pitch movements are the rotational motion around a lateral axis of the absorber and result in alternating compressions and extension of the cylinders.

Motion occurring in all six degrees of freedom of the absorber is transferred to one or more power takeoff units, which transform the absorber motion into a standard form of mechanical power. A restoring force is in place to ensure the absorber oscillates about a set equilibrium.

The maximum energy extraction potential for any wave energy converter is achieved when the primary absorbing body's natural frequency matches the frequency of the principle energy-carrying component of the sea state spectrum at a given moment. This frequency matching is known as resonance.

In one embodiment, the movements of the absorber body are preferably in resonance with the current wave conditions. The absorber resonance frequency is a function of the 1) the absorber's mass, 2) the absorber's buoyancy, 3) the restoring force of the power takeoff unit(s) attached to the absorber, 4) the power extracting characteristics of the power takeoff acting on the absorber (damping), and 5) the absorber's hydrodynamic added mass and radiation damping. The added mass and radiation damping is itself a function of the absorber's depth and geometry, the latter component is dominated by the area normal to the absorber's motion.

Control of all these components may be coordinated to achieve maximum power extraction or load reduction on the absorber from incident waves. The system can include several redundant, independent mechanisms for matching the response characteristics of the apparatus to ocean wave conditions. For example, the same controllable apertures described above for load management will also affect the hydrodynamic absorber properties, and thus the natural frequency of the absorber, by changing the shape of the absorber. Submergence depth can be used as a parameter to change the hydrodynamic absorber properties, and thus resonance frequency, of the apparatus, and is also considered in calculations to set other parameters for resonance control. The power takeoff units of the apparatus can also affect the absorber resonance frequency in all degrees of freedom through both the restoring force component ("spring") and energy extraction component ("damper").

Figure 23A:
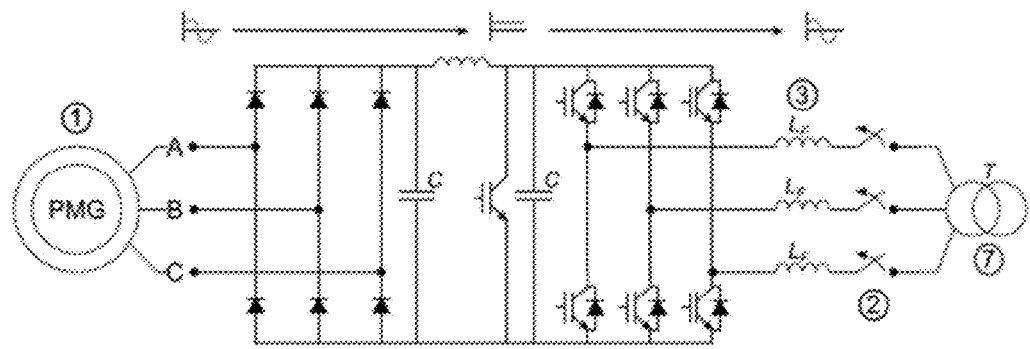
FIGS. 23A-23B illustrate examples of an electrical subsystem that may be used to interface the converted wave energy to the grid.
Figure 23B:
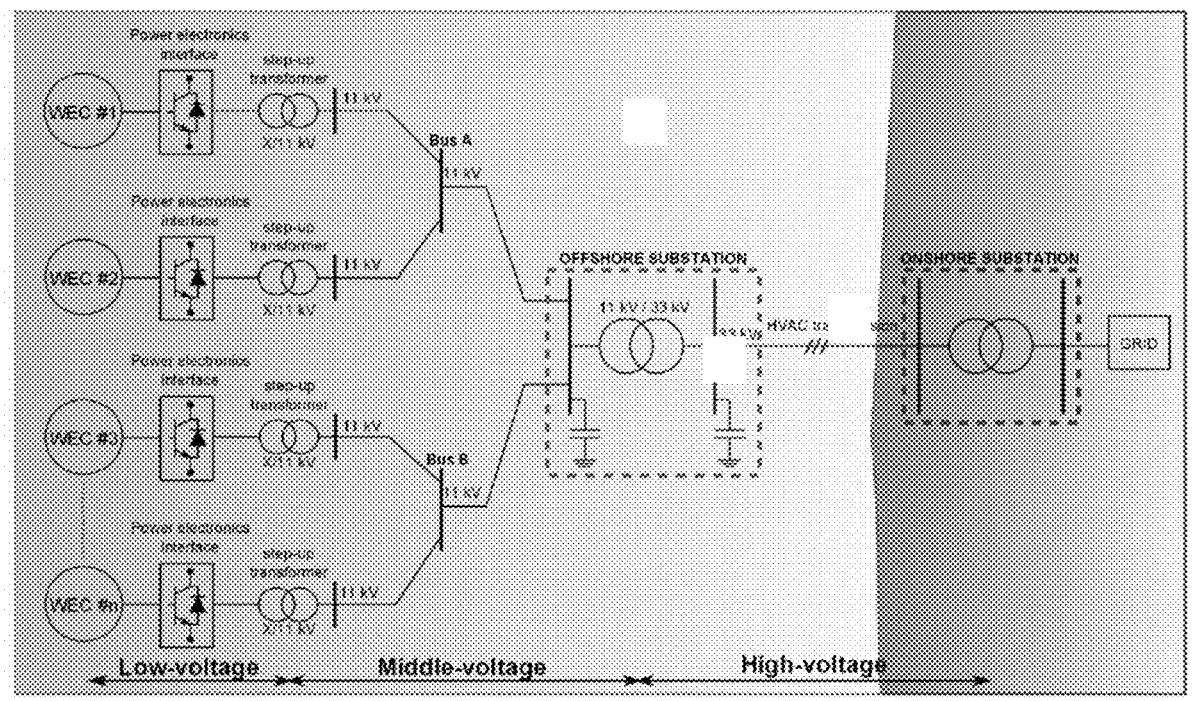

The dominant wave energy frequency conditions change continuously throughout the year and it is useful to tune the wave energy converter apparatus to achieve the optimum energy production from the system in a broad range of ocean conditions such as wave height, wave period and spectral shape. The system can be tuned, for example, by changing the operating depth and/or the aperture opening, hydrodynamic coefficients. FIGS. 23A and 23B illustrate examples of interfaces used to interface hydraulic cylinders to a hydraulic motor and generator, including the coupling in between. Both FIGS. 23A and 23B include control values (PTO_i, CV_main), control value accumulators, check values, and accumulators for use for short term energy storage and longer term energy storage that interface to a generator. In more complex embodiments, additional valves can be used to connect hydraulic power stored temporarily in accumulators directly to ports of the hydraulic cylinder, allowing for reactive power and active motion control. These elements operate in a manner well-known to those skilled in the art.

FIG. 26 illustrates an example of an electrical subsystem that may be used to interface the converted wave energy to the grid. The operation of the depicted electrical subsystem is well-known in the art.

Referring back to control mechanisms of the wave energy converting apparatus to manage loads, in one embodiment, such control mechanisms control the operating depth of the wave energy converting apparatus, or portion thereof. The time-varying pressure differentials which create the motive force on the absorber body decrease in amplitude with increasing water depth. Thus, an absorber that is lower in the water column will experience lower overall absorber excitation and thus structural loads compared to the same absorber configuration higher in the water column. In one embodiment, the system maintains the ability to adjust its submergence. Controllable operating depth is thus an important parameter to the system for load management and optimal operation.

In one embodiment, a base platform or absorber of a wave energy converter apparatus is connected to the mooring lines via submersible, lockable winches (e.g., four lockable winches), each of which can operate independently on its associated mooring line. The winches enable the platform to be pulled into an operating location. Once in place, the winches lock and significantly increase their holding capacity. In one embodiment, a ballasting system in the platform body is adjusted to secure tension in the taut mooring lines at all times while mooring winches on the platform frame are used to equalize tension among mooring lines and to change operating depth during operations, deployment, maintenance, and recovery.

In one embodiment, the wave energy converter apparatus is controlled by a holistic device control architecture as shown in the Interface Control Chart (ICC) in FIG. 12. The control architecture embraces a SCADA system 1409 receiving information in the form of data from sensors integrated into the various components of the device 1401-1406, 1408-1409. This information may comprise, but is not limited to, instantaneous, time history averaged, or predictions of wave period and height, water level, tide, and current environmental data 1401, PTO forces, strokes, velocities 1403, data from GPS and/or inertial measurement units (IMUs) 1402, structural monitoring data from strain sensors installed on load-bearing elements of the device, hull pressure data 1409, PTO motor/generator voltage, torque and speed data 1406, accumulator, capacitor, battery or other kind of energy storage information 1405, mooring tether or winch forces and position data 1404, ballast system information 1408 and wave pressure relieve mechanism state information.

In one embodiment the holistic control architecture receives and sends additional information and/or commands from external databases 1410 or user defined input via satellite, radio frequency, acoustic frequency, optical communication, or other bi-directional communication lines.

In one embodiment of the holistic control architecture a submergence depth supervisory controller, a PTO and electrical conversion chain supervisory controller, a WEC absorber body/wave pressure relieve mechanism supervisory controller, and a ballast system supervisory controller receive commands from the main holistic controller 1411 and send commands to the physical mechanisms 1417-1418, 1416, 1420

The supervisory controllers are capable of bidirectional communication with the physical mechanism through sensors, as well as bidirectional communication with each other and independently to external monitoring systems, In one embodiment of the holistic control architecture, machine learning algorithms might update the control commands which are send through the holistic controller to the supervisory controllers for different subcomponents of the WEC.

The holistic control framework described herein enables control of hydrodynamic properties of the apparatus by control of one or many actuation methods, collected under the term HyTune 1411. HyTune embraces absorber structure and individual PTO load management by controlling embedded physical mechanism 1417-1418, 1416, 1420 to alter wave excitation (Froude-Krylov and diffraction) forces (e.g., exponential load decay with increasing apparatus depth for effective load mitigation), absorber radiation damping forces, and hydrodynamic added mass in such a way that optimal wave power absorption conditions are met while considering control limits imposed from the various component control subsystems.

In one embodiment of the holistic control framework described herein, the framework embraces control means to alter PTO characteristics such as damping behavior and restoring force coefficients to match the sea state for optimal power absorption in combination with hydrodynamic tuning means described above or to accompany hydrodynamic control means described above for load management (e.g., load mitigation in severe sea). For each energy producing operation sea station condition, the purpose of the holistic control approach is to control wave excitation on and hydrodynamic properties of the absorber in such a way that the device can extract energy out of the water waves in the most efficient way while not exceeding structural or component design load limitations. This control approach and enables effective load management by means of relatively small operating depth adjustments and absorber geometry changes and includes but is not limited to highly responsive mitigation of extreme loads and peak stress during storm events.

For severe storm conditions or harsh wave climates, which only insignificantly contribute to available annual energy, the holistic control framework can control the device to move deeper in the water column to the required safety operating depth using the mooring winches, while independently and in parallel the system can adjust physically or virtually implemented PTO damping and restoring force coefficients to decrease loads on the absorber. Additionally, passive safety apertures or active safety apertures (e.g., FIGS. 15 and 16) can decrease excitation force if a specific local fluid pressure is reached or the actively controlled safety apertures might be partially or fully opened. The holistic controller can orient the absorber position in such a way wave excitation loads are decreased.

Accordingly, the submerged pressure-differential design and the accompanying load management system allow for operation within specified limits to balance energy capture with the requirement to avoid damaging loads throughout the life of the apparatus.

As discussed above, for load mitigation and management purposes, winches and the aperture mechanisms represent complementary systems which can be used to compensate a failure of one or the other system. In the case of a loss of functionality of the aperture load management system, the apparatus can be winched down and the capabilities for reduced operation can then be assessed. In the case of loss of a mooring winch, the apparatus can still be brought to the surface by winching the remaining systems and pivoting around the mooring point associated with the failed winch.

One response to the loss of PTO control is to switch the apparatus from operating to idle mode. The absorber aperture can be fully opened as a safety mechanism to effectively mitigate wave excitation load. The positive buoyancy of the platform can be adjusted using the ballast system tanks to reduce mean mooring line tension. If required, operating depth reduction can be executed to further reduce wave excitation loads. A damaged PTO can be disconnected modular from the absorber structure and replaced during a maintenance procedure.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

From the description herein, it will be appreciated that that the present disclosure encompasses multiple embodiments which include, but are not limited to, the following:

1. A submerged wave energy converter apparatus, comprising: (a) an absorber body with an upper surface and a bottom surface; (b) a spring-damper mechanism in a Power Takeoff unit coupled to and/or integrate into the absorber body, the spring-damper mechanism configured to exert forces based on the movement of the absorber body relative to the mooring line/reaction point and input from sensors integrated into the absorber body's subcomponents and body hull; (c) at least one energy converter body connected to the PTO; and (d) at least one restoring force mechanism in the PTO units configured to return a displaced absorber body to a set equilibrium position; (e) wherein displacement of the absorber body relative to the equilibrium position as a response to wave excitation actuates the Power Takeoff units.

2. The apparatus of any preceding embodiment, further comprising: A ballast system capable of increasing or decreasing buoyancy of the apparatus; and a mooring system having one or a plurality of mooring lines.

3. The apparatus of any preceding embodiment, wherein that mooring lines are anchored with an anchor (e.g., a vertical load anchor, a dead-weight anchor, a direct embedment anchor, etc.).

4. The apparatus of any preceding embodiment, wherein the mooring system further comprises: a locking winch comprising one or multiple of a spool, capstan, windlass, gearbox and motor/generator coupled to each mooring line; and a winch controller.

5. The apparatus of any preceding embodiment, wherein the power takeoff unit(s) comprise: a cylinder with a piston; and a closed hydraulic system, where linear movement of the piston of the cylinder pressurized fluid in the hydraulic system.

6. The apparatus of any preceding embodiment, wherein the hydraulic system further comprises: an accumulator bank; a hydraulic motor; and an electrical generator The apparatus of any preceding embodiment, wherein the power takeoff unit(s) comprise: a belt, a drum or spool, a rotary electric machine, and a braking mechanism.

7. The apparatus of any preceding embodiment, wherein the linear motion energy converter comprises: a cylinder with an arm, an armature and a stator, where linear movement of the armature in relation to the stator generates electrical current.

8. The apparatus of any preceding embodiment, wherein said restoring force mechanism comprises a mechanism selected from the group of a mechanical spring, an air spring and an electric machine generating a restoring force.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

In the claims, reference to an element in the singular is not intended to mean "one and only one" unless explicitly so stated, but rather "one or more." All structural, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

In addition to any other claims, the applicant(s)/inventor(s) claim each and every embodiment of the technology described herein, as well as any aspect, component, or element of any embodiment described herein, and any combination of aspects, components or elements of any embodiment described herein.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A fully submerged wave energy converter apparatus, comprising:
    an absorber body having positive buoyancy when fully submerged;
    a first power take-off unit embedded into the absorber body, the first power take-off unit being directly mechanically coupled to a first angled mooring connection, the first angled mooring connection to be anchored to a sea floor;
    a second power take-off unit embedded into the absorber body, the second power take-off unit being directly mechanically coupled to a second angled mooring connection, the second angled mooring connection to be anchored to the sea floor, the first power take-off unit and the second power take-off unit being operable to perform motion energy conversion based on displacement of the absorber body due to wave excitation,
    wherein the first power take-off unit and the second power take-off unit extract net positive energy from at least one of surge, sway, heave, roll, and pitch motion of the absorber body.

2. The wave energy converter apparatus of claim 1, wherein the first power take-off unit, the second power take-off unit, the first angled mooring connection, the second angled mooring connection, and the absorber body extract energy from incident ocean waves in multiple degrees of freedom.

3. The wave energy converter apparatus of claim 1, wherein the first angled mooring connection is coupled to a distinct anchor.

4. The wave energy converter apparatus of claim 1, further comprising a ballast system to increase or decrease buoyancy of the absorber body.

5. The wave energy converter apparatus of claim 1, wherein the first power take-off unit comprises a closed hydraulic system having a cylinder with a piston, wherein linear movement of the piston pressurizes hydraulic fluid to be discharged in a hydraulic motor coupled to an electric generator.

6. The wave energy converter apparatus of claim 1, wherein the first power take-off unit comprises a winch drum connected to a rotating shaft, a rack and pinion assembly, a mechanical ball screw, or a magnetic lead screw assembly to convert linear mechanical motion into rotary motion or rotary motion into linear motion.

7. The wave energy converter apparatus of claim 1, wherein one of the first power take-off unit or the second power take-off unit comprises a gas-spring comprising a closed hydraulic system including a piston, wherein linear movement of the piston pressurizes fluid in hydraulic accumulators for energy storage or a rotary generator.

8. The wave energy converter apparatus of claim 1, wherein one of the first power take-off unit or the second power take-off unit comprises a driven rotary electrical machine, a linear generator assembly, a mechanical spring, a mechanical clutch, or a mechanical brake.

9. The wave energy converter apparatus of claim 1, wherein the first power take-off unit and the second power take-off unit extract net positive energy from vertical motion, horizontal motion, and rotational motion of the absorber body.

10. The wave energy converter apparatus of claim 1, further comprising an aperture in the absorber to alter total impedance of the apparatus and/or incident ocean wave excitation.

11. The wave energy converter apparatus of claim 10, further comprising an aperture control mechanism to open or close the aperture based on a control or environmental input.

12. The wave energy converter apparatus of claim 11, wherein the aperture control mechanism comprises a passive control mechanism to open or close the aperture.

13. The wave energy converter apparatus of claim 1, further comprising a depth adjustment mechanism to adjust the absorber body's submergence depth based on a control input.

14. The wave energy converter apparatus of claim 13, wherein one of the first power take-off unit or the second power take-off unit comprises the depth adjustment mechanism.

15. The wave energy converter apparatus of claim 1, further comprising a control system receiving input from sensors, databases and/or an operator to control wave loads and energy output of the apparatus.

16. A wave energy converter apparatus, comprising:
    an absorber body having positive buoyancy when fully submerged;
    a power take-off unit embedded into the absorber body, the power take-off unit directly coupled to an angled mooring line, the angled mooring line to be anchored to a sea floor, the power take-off unit being operable to perform motion energy conversion based on displacement of the absorber body due to wave excitation,
    wherein the power take-off unit extracts net positive energy from surge, sway, heave, roll, and pitch motion of the absorber body; and
    a ballast system to control buoyancy of the absorber body.

17. A method for using a wave energy converter apparatus, comprising:
    submerging an absorber, the absorber having a body having an upper surface and a bottom surface, wherein the absorber has a positive buoyancy when fully submerged;

extracting energy from incident ocean waves using a first power take-off unit embedded into the absorber body, the first power take-off unit being directly mechanically coupled to a first angled mooring connection, the first angled mooring connection anchored to a sea floor; and extracting energy from incident ocean waves using a second power take-off unit embedded into the absorber body, the second power take-off unit being directly mechanically coupled to a second angled mooring connection, the second angled mooring connection being anchored to the seafloor, wherein the first and second power take-off units perform motion energy conversion based on displacement of the absorber body due to wave excitation, and wherein the first power take-off unit and the second power take-off unit extract net positive energy from at least one of surge, sway, heave, roll, and pitch motion of the absorber body.

18. The method of claim 17, wherein the first angled mooring connection comprises a mooring line coupled to a distinct anchor on the sea floor.

\* \* \* \* \*